(12) United States Patent
Kurashige et al.

(10) Patent No.: US 10,146,183 B2
(45) Date of Patent: Dec. 4, 2018

(54) ILLUMINATION DEVICE, PROJECTION APPARATUS AND PROJECTION-TYPE IMAGE DISPLAY APPARATUS

(71) Applicant: Dai Nippon Printing Co., Ltd., Tokyo (JP)

(72) Inventors: Makio Kurashige, Kashiwa (JP); Kazutoshi Ishida, Saitama (JP); Tomoe Takanokura, Katsushika-Ku (JP); Yasuyuki Ooyagi, Funabashi (JP)

(73) Assignee: Dai Nippon Printing Co., Ltd., Shinjuku-Ku (JP)

( * ) Notice: Subject to any disclaimer, the term of this patent is extended or adjusted under 35 U.S.C. 154(b) by 0 days.

(21) Appl. No.: 15/162,971

(22) Filed: May 24, 2016

(65) Prior Publication Data
US 2016/0266545 A1    Sep. 15, 2016

Related U.S. Application Data
(63) Continuation of application No. 13/821,103, filed as application No. PCT/JP2011/070519 on Sep. 8, 2011, now Pat. No. 9,377,759.

(30) Foreign Application Priority Data

Sep. 8, 2010    (JP) ................................. 2010-201384

(51) Int. Cl.
*G03H 1/26* (2006.01)
*G02B 5/32* (2006.01)
(Continued)

(52) U.S. Cl.
CPC .............. *G03H 1/265* (2013.01); *G02B 5/32* (2013.01); *G02B 26/101* (2013.01); *G02B 27/48* (2013.01);
(Continued)

(58) Field of Classification Search
CPC ........ G03H 1/265; G03H 1/22; G03H 1/2249; G03H 1/2202; G03H 1/2286; G03H 1/32;
(Continued)

(56) References Cited

U.S. PATENT DOCUMENTS

| | | | |
|---|---|---|---|
| 5,313,479 A | 5/1994 | Florence | |
| 6,127,066 A | 10/2000 | Ueda et al. | |

(Continued)

FOREIGN PATENT DOCUMENTS

| | | |
|---|---|---|
| EP | 2 165 363 | 3/2010 |
| JP | 02-236538 A1 | 9/1990 |

(Continued)

OTHER PUBLICATIONS

Japanese Office Action (Application No. 2015-101344) dated Dec. 2, 2016 (with English translation).

(Continued)

*Primary Examiner* — Jade R Chwasz
(74) *Attorney, Agent, or Firm* — Burr & Brown, PLLC

(57) ABSTRACT

An optical device including a hologram recording medium that can reproduce an image of a reference member and an irradiation unit that emits a coherent light beam to the optical device. The irradiation unit includes a light source for emitting a coherent light beam and a scanning device capable of adjusting a reflection angle of the coherent light beam emitted from the light source and that makes a reflected coherent light beam scan the hologram recording medium. The light source has light sources for emitting coherent light beams having different wavelength ranges. The hologram recording medium has a plurality of recording areas to be scanned with a plurality of coherent light beams reflected by the scanning device, respectively. Each of the (Continued)

plurality of recording areas has an interference fringe that diffracts a coherent light beam of the corresponding wavelength range.

11 Claims, 14 Drawing Sheets

(51) Int. Cl.
  *G02B 26/10* (2006.01)
  *G02B 27/48* (2006.01)
  *G03B 21/20* (2006.01)
  *G03B 33/06* (2006.01)
  *G03H 1/22* (2006.01)
  *G03H 1/32* (2006.01)
  *H04N 9/31* (2006.01)
  *G03H 1/00* (2006.01)

(52) U.S. Cl.
  CPC ......... *G03B 21/2033* (2013.01); *G03B 33/06* (2013.01); *G03H 1/22* (2013.01); *G03H 1/2202* (2013.01); *G03H 1/2249* (2013.01); *G03H 1/2286* (2013.01); *G03H 1/32* (2013.01); *H04N 9/3129* (2013.01); *H04N 9/3161* (2013.01); *G03H 1/0005* (2013.01); *G03H 2001/2231* (2013.01); *G03H 2001/2263* (2013.01); *G03H 2001/2271* (2013.01); *G03H 2001/2292* (2013.01); *G03H 2001/266* (2013.01); *G03H 2222/36* (2013.01)

(58) Field of Classification Search
  CPC ......... G03H 1/0005; G03H 2001/2231; G03H 2001/2263; G03H 2001/2292; G03H 2001/266; G03H 2222/36; G02B 5/32; G02B 26/101; G02B 27/48; G03B 21/2083; G03B 33/06; H04N 9/3129; H04N 9/3161
  USPC .......... 359/24, 10, 11, 17, 15, 21, 22, 28, 32
  See application file for complete search history.

(56) References Cited

U.S. PATENT DOCUMENTS

| 8,007,141 | B2 | 8/2011 | Matsubara et al. |
| 9,377,759 | B2 | 6/2016 | Kurashige et al. |
| 2004/0004586 | A1 | 1/2004 | Endo et al. |
| 2006/0033009 | A1 | 2/2006 | Kobayashi et al. |
| 2006/0138239 | A1 | 6/2006 | Sonoda et al. |
| 2007/0014318 | A1 | 1/2007 | Hajjar et al. |
| 2008/0187012 | A1 | 8/2008 | Yamauchi et al. |
| 2008/0247022 | A1 | 10/2008 | Yamauchi et al. |
| 2008/0309998 | A1 | 12/2008 | Nakamura |
| 2009/0168134 | A1 | 7/2009 | Nojima |
| 2009/0168424 | A1 | 7/2009 | Yamauchi et al. |
| 2009/0323030 | A1 | 12/2009 | Hazama et al. |
| 2010/0020291 | A1 | 1/2010 | Kasazumi et al. |
| 2010/0182073 | A1 | 7/2010 | Daumiller et al. |
| 2010/0230727 | A1 | 9/2010 | Daumiller et al. |

FOREIGN PATENT DOCUMENTS

| JP | 06-208089 A1 | 7/1994 |
| JP | 09-146066 A1 | 6/1997 |
| JP | H11-64789 | 3/1999 |
| JP | 2000-019641 A1 | 1/2000 |
| JP | 2004-038012 A1 | 2/2004 |
| JP | 2004-184821 A1 | 7/2004 |
| JP | 2004-264512 A1 | 9/2004 |
| JP | 2006-184663 A1 | 7/2006 |
| JP | 2008-058665 A1 | 3/2008 |
| JP | 2008-158512 A1 | 7/2008 |
| JP | 2008-212444 A1 | 9/2008 |
| JP | 2008-256822 | 10/2008 |
| JP | 2008-256824 A1 | 10/2008 |
| JP | 2008-262029 A1 | 10/2008 |
| JP | 2008-262030 | 10/2008 |
| JP | 2009-169012 A1 | 7/2009 |
| JP | 2009-186647 A1 | 8/2009 |
| JP | 2015-212824 | 11/2015 |
| WO | 01/81996 A1 | 11/2001 |
| WO | 2006/137326 A1 | 12/2006 |
| WO | WO2012/033174 | 2/2012 |

OTHER PUBLICATIONS

Joseph W. Goodman, "Speckle Phenomena in Optics Theory and Applications," Chapter 6, Speckle in Certain Imaging Applications, Roberts & Co., 2006, pp. 187-233.
International Search Report dated Oct. 18, 2011.
Extended European Search Report (Application No. 11823648.8) dated Mar. 5, 2014.
Japanese Office Action (Application No. 2012-533027) dated Sep. 26, 2014 (with English translation).
Japanese Office Action (Application No. 2015-101344) dated Apr. 22, 2016 (with English translation).
Japanese Office Action (Application No. 2017-140158) dated Jul. 3, 2018 (with English translation).

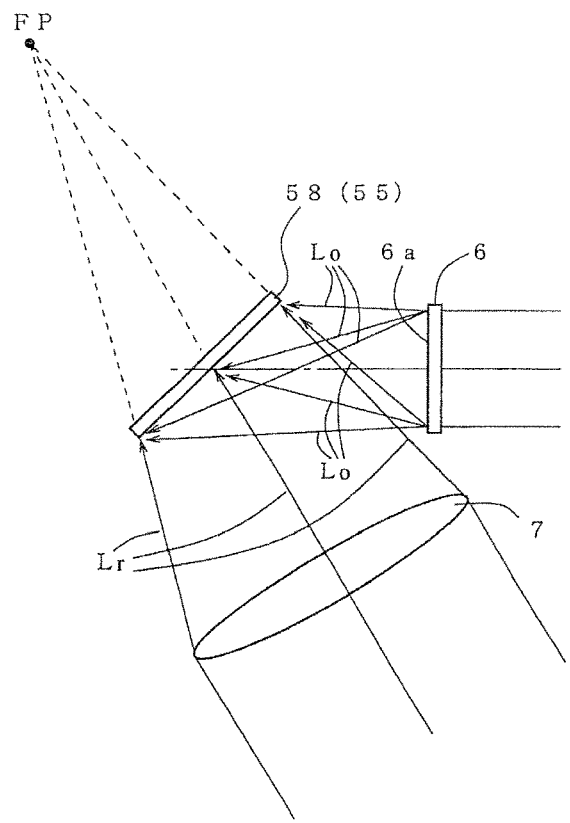
F I G. 3
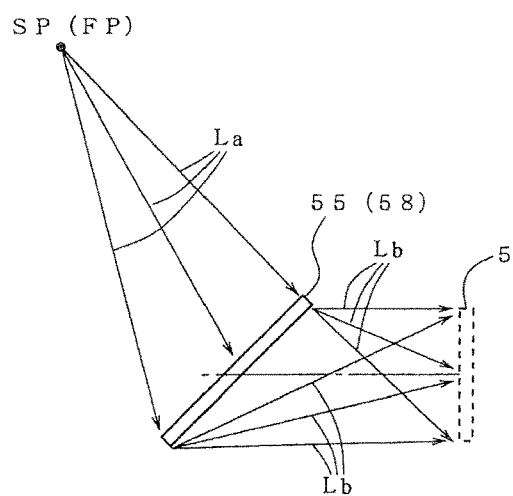
F I G. 4

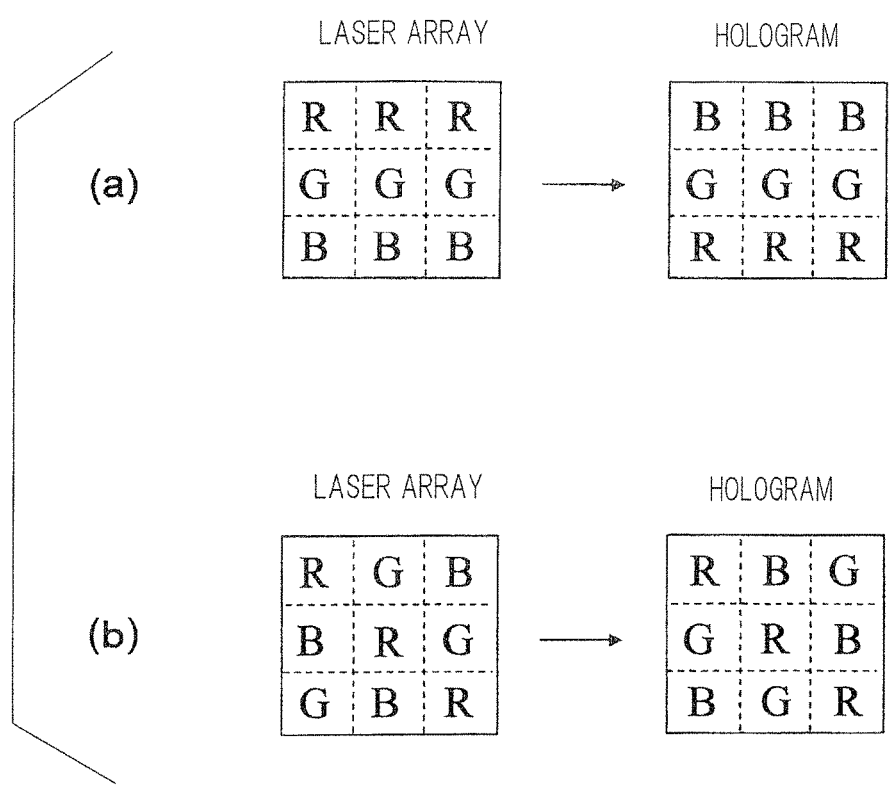
F I G. 11

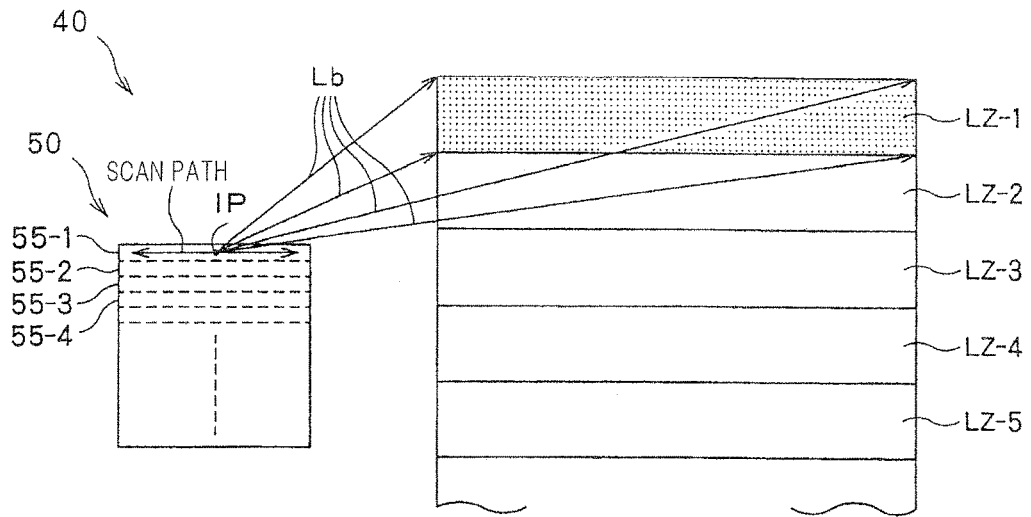
F I G. 14
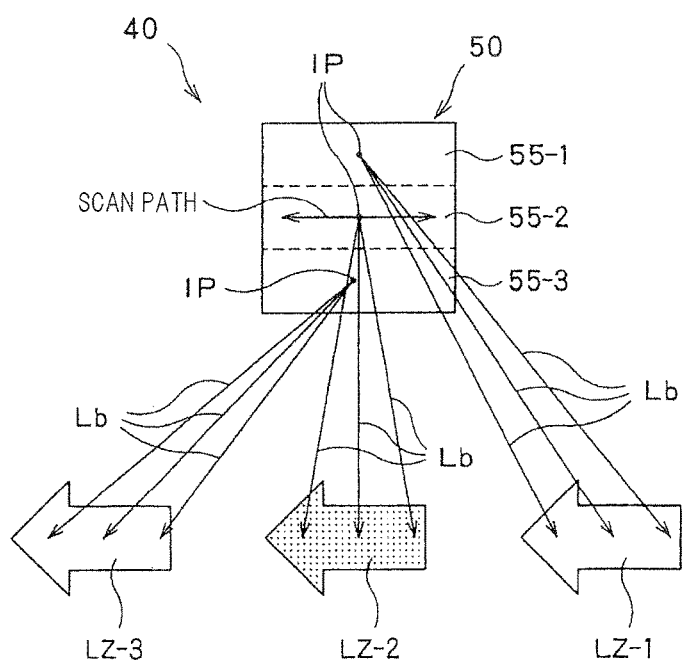
F I G. 15

ILLUMINATION DEVICE, PROJECTION APPARATUS AND PROJECTION-TYPE IMAGE DISPLAY APPARATUS

CROSS REFERENCE TO RELATED APPLICATIONS

This application is a continuation of U.S. application Ser. No. 13/821,103, filed Mar. 6, 2013, which in turn is the National Stage of International Application No. PCT/JP2011/070519 filed Sep. 8, 2011, which designated the United States, the entireties of which are incorporated herein by reference.

FIELD OF THE INVENTION

The present invention relates to an illumination device for illuminating a region repeatedly with coherent light beams that are diffracted by a hologram recording medium or the like, a projection apparatus for projecting coherent light beams, and a projection-type image display apparatus for displaying images using coherent light beams, and more particularly, to an illumination device, a projection apparatus and a projection-type image display apparatus capable of making speckles inconspicuous.

BACKGROUND OF THE INVENTION

Projection-type image display apparatuses having a screen and a projection apparatus which projects light beams of an image onto the screen have been widely used. In a typical projection-type image display apparatus, a two-dimensional image is created as a basic image using a spatial light modulator such as a liquid crystal microdisplay or a DMD (Digital Micromirror Device), and then the two-dimensional image is magnified and projected onto a screen using a projection optical system, so that an image is displayed on the screen.

As projection apparatuses, various types including a commercialized product called an "optical projector" have been proposed. In general optical projectors, a spatial light modulator such as a liquid crystal display is illuminated using an illumination device having a white light source such as a high pressure mercury lamp to obtain a modulated image, and the obtained modulated image is magnified and projected onto a screen through lenses. For example, Japanese Patent Laid-Open No. 2004-264512 discloses a technique to divide white light generated by a supper-high pressure mercury lamp into three primary color components R, G, and B with a dichroic mirror, guide these light beams to spatial light modulators corresponding to the respective primary colors to create modulated images, and combine the created modulated images corresponding to the respective primary colors by a cross dichroic prism, to project the images onto a screen.

However, high intensity discharge lamps such as high pressure mercury lamps have a short lifecycle and when they are used for optical projectors or the like, they need to be frequently replaced. In addition, since a relatively large optical system such as a dichroic mirror is needed to extract light beams of the respective primary color components, there is a problem in that the entire system becomes larger.

In order to cope with such problems, a system using a coherent light source such as a laser has also been proposed. For example, semiconductor lasers which have been widely used in industries have a very long lifecycle in comparison with high intensity discharge lamps such as high pressure mercury lamps. In addition, since semiconductor lasers are capable of generating light of a single wavelength, a spectroscopic apparatus such as a dichroic mirror is unnecessary, so that there is an advantage in that the entire system becomes smaller.

On the other hand, in the system using a coherent light source of laser beams or the like, there is another problem in that speckles are generated. Speckles are a spotted pattern which is formed when a coherent light beam such as a laser beam is emitted to a scattering plane. If speckles are generated on a screen, they are observed as spotted luminance unevenness, i.e. brightness unevenness, thus becoming a factor of having physiologically adverse affect on an observer. It is considered that the reason why speckles are generated in the case of using coherent light beams is that coherent light beams reflected from respective portions of a scattering and reflecting plane such as a screen have very high coherency so that coherent light beams interfere with one another to generate speckles. For example, a theoretical review of the generation of speckles is made in detail in Speckle Phenomena in Optics, Joseph W. Goodman, Roberts & Co., 2006.

As discussed above, in the system using a coherent light source, since there is a problem of generation of speckles unique to the coherent light source, techniques for suppressing the generation of speckles have been proposed. For example, Japanese Patent Laid-Open No. 6-208089 discloses a technique in which a laser beam is emitted to a scattering plate, scattered light beams obtained therefrom are guided to a spatial light modulator, and the scattering plate is driven to rotate by a motor, thus reducing speckles.

SUMMARY OF THE INVENTION

As described above, with respect to projection apparatuses and projection-type image display apparatuses using a coherent light source, techniques for reducing speckles have been proposed, however, the techniques proposed so far cannot effectively and sufficiently suppress the generation of speckles. For example, according to the method disclosed in Japanese Patent Laid-Open No. 6-208089 described above, laser beams irradiated to a scattering plate are scattered. Therefore, part of the laser beams is inevitably lost with no contribution to image display. In addition, a scattering plate needs to be rotated in order to reduce speckles. However, such a mechanical rotation mechanism becomes a relatively large apparatus, and power consumption is increased. Moreover, even if the scattering plate is rotated, the position of the optical axis of an illumination light beam is not changed, hence it is impossible to sufficiently suppress the generation of speckles caused by the diffusion on a screen.

Moreover, speckles are not a problem unique to projection apparatuses, projection-type image display apparatuses and the like but a problem to various apparatuses having an illumination device incorporated therein for illuminating an illumination zone with coherent light beams. For example, scanners for reading image information have an illumination device incorporated therein for illuminating an object to be read. When speckles are generated due to light that illuminates an object to be read, it is impossible to read image information accurately. In order to avoid such inconvenience, scanners utilizing coherent light beams are required to perform a special process such as image correction.

Coherent light beams, for example laser beams as a typical example, exhibit excellent straightness and can emit a light of extremely high energy density. Therefore, illumination devices actually developed are preferable to design the optical path of coherent light beams in accordance with the characteristics of coherent light beams.

The inventors have extensively researched under consideration of the points discussed above, and as a result, the inventors have contrived the invention regarding an illumination device which illuminates a region repeatedly with coherent light beams that are diffracted by a hologram recording medium or the like, and can make speckles inconspicuous. Moreover, the inventors have proceeded with researches and succeeded in improvement in the illumination device to constantly prevent the generation of a region extremely bright in the region illuminated with coherent light beams which have been diffracted by a hologram recording medium and superimposed one another on the region. Namely, the purpose of the present invention is to provide an illumination device capable of making speckles inconspicuous and effectively suppressing the generation of brightness unevenness in a region illuminated with coherent light beams which have been diffracted by a hologram recording medium and superimposed one another on the region, and a projection apparatus and a projection-type image display apparatus that include the illumination device.

In order to solve the problems above, according to an aspect of the present invention, there is provided an illumination device comprising:

an optical device including a hologram recording medium capable of reproducing an image of a scattering plate; and an irradiation unit configured to irradiate a coherent light beam to the optical device so that the coherent light beam scans the hologram recording medium, wherein the irradiation unit comprises:

a light source for emitting a coherent light beam; and a scanning device configured to be capable of adjusting a reflection angle of the coherent light beam emitted from the light source and to make a reflected coherent light beam scan the hologram recording medium, wherein the light source comprises a plurality of light sources for emitting a plurality of coherent light beams having different wavelength ranges, the hologram recording medium comprises a plurality of recording areas to be scanned with a plurality of coherent light beams reflected by the scanning device, respectively, and each of the plurality of recording areas comprises an interference fringe that diffracts a coherent light beam of the corresponding wavelength range, wherein the optical device uses the plurality of coherent light beams reflected by interference fringes of the plurality of recording areas to reproduce the image of the reference member so that each of the coherent light beams is diffracted by the hologram recording medium and the diffracted coherent light beams are superimposed on an illumination zone.

According to an aspect of the present invention, there is provided an illumination device comprising:

an optical device comprising a hologram recording medium that can reproduce an image of a reference member; and an irradiation unit configured to irradiate a coherent light beam to the optical device so that the coherent light beam scans the hologram recording medium, wherein the irradiation unit comprises:

a light source configured to emit a coherent light beam; and a scanning device configured to be capable of adjusting a reflection angle of the coherent light beam emitted from the light source and to make a reflected coherent light beam scan the hologram recording medium, wherein the light source comprises a plurality of light sources configured to emit a plurality of coherent light beams having different wavelength ranges, and the hologram recording medium comprises a plurality of recording areas to be scanned with a plurality of coherent light beams reflected by the scanning device, respectively, and each of the plurality of recording areas comprises an interference fringe that diffracts a coherent light beam of the corresponding wavelength range, wherein the optical device uses the plurality of coherent light beams reflected by interference fringes of the plurality of recording areas to reproduce the image of the reference member so that each of the coherent light beams is diffracted by the hologram recording medium and the diffracted coherent light beams are superimposed on at least one portion.

According to the present invention, it is possible to effectively make speckles inconspicuous in a region or on an image projection surface superimposingly illuminated with coherent light beams diffracted by a hologram recording medium or the like and effectively suppress the generation of unevenness of brightness and color in the region or on the image projection surface.

BRIEF DESCRIPTION OF THE DRAWINGS

FIG. 3 is a view explaining a state in which an image of a scattering plate is formed on a hologram recording medium 55 as interference fringes;

FIG. 4 is a view explaining a state in which an image of a scattering plate is reproduced using interference fringes generated in the hologram recording medium 55 obtained through an exposure process of FIG. 3;

FIG. 11 is a view explaining color arrangement in a laser array;

FIG. 14 is a view explaining one modification of an optical device, that is a plan view showing an optical device with the corresponding illumination zones;

FIG. 15 is a view explaining another modification of the optical device, that is a plan view showing an optical device with the corresponding illumination zones;

DETAILED DESCRIPTION OF THE INVENTION

Hereinafter, embodiments of the present invention will be explained with reference to the drawings. In the accompanying drawings of the present description, for the sake of simplicity in drawings and of ease of understanding, the scale, the ratio of height to width, etc., are appropriately modified or enlarged.

An illumination device, a projection apparatus, and a projection-type image display apparatus according to an embodiment of the present invention have a configuration capable of effectively preventing the generation of speckles, as a basic configuration. Moreover, an illumination device, a projection apparatus, and a projection-type image display apparatus according to an embodiment of the present invention have a configuration as being added to the basic configuration capable of effectively preventing the generation of speckles, capable of stably achieving high quality and being safely used, by designing optical paths of coherent light beams while focusing on the characteristics of coherent light beams such as high coherency and high energy density.

In the following description, by referring to an illumination device and a projection-type image display apparatus exemplified in FIGS. 1 to 8, a configuration for making speckles inconspicuous, advantageous effects exhibited based on the configuration, and a modification of the configuration will be explained as a basic embodiment. Subsequently, a configuration that can be added to the basic embodiment, capable of stably achieving high quality and being safely used, advantageous effects exhibited based on the configuration, and a modification of the configuration will be explained as an additional embodiment.

BASIC EMBODIMENT

Configuration of Basic Embodiment

Firstly, a configuration of a projection-type image display apparatus including an illumination device and a projection apparatus for projecting coherent light beams and capable of making speckles inconspicuous will be explained referring mainly to FIGS. 1 to 8.

Figure 1:
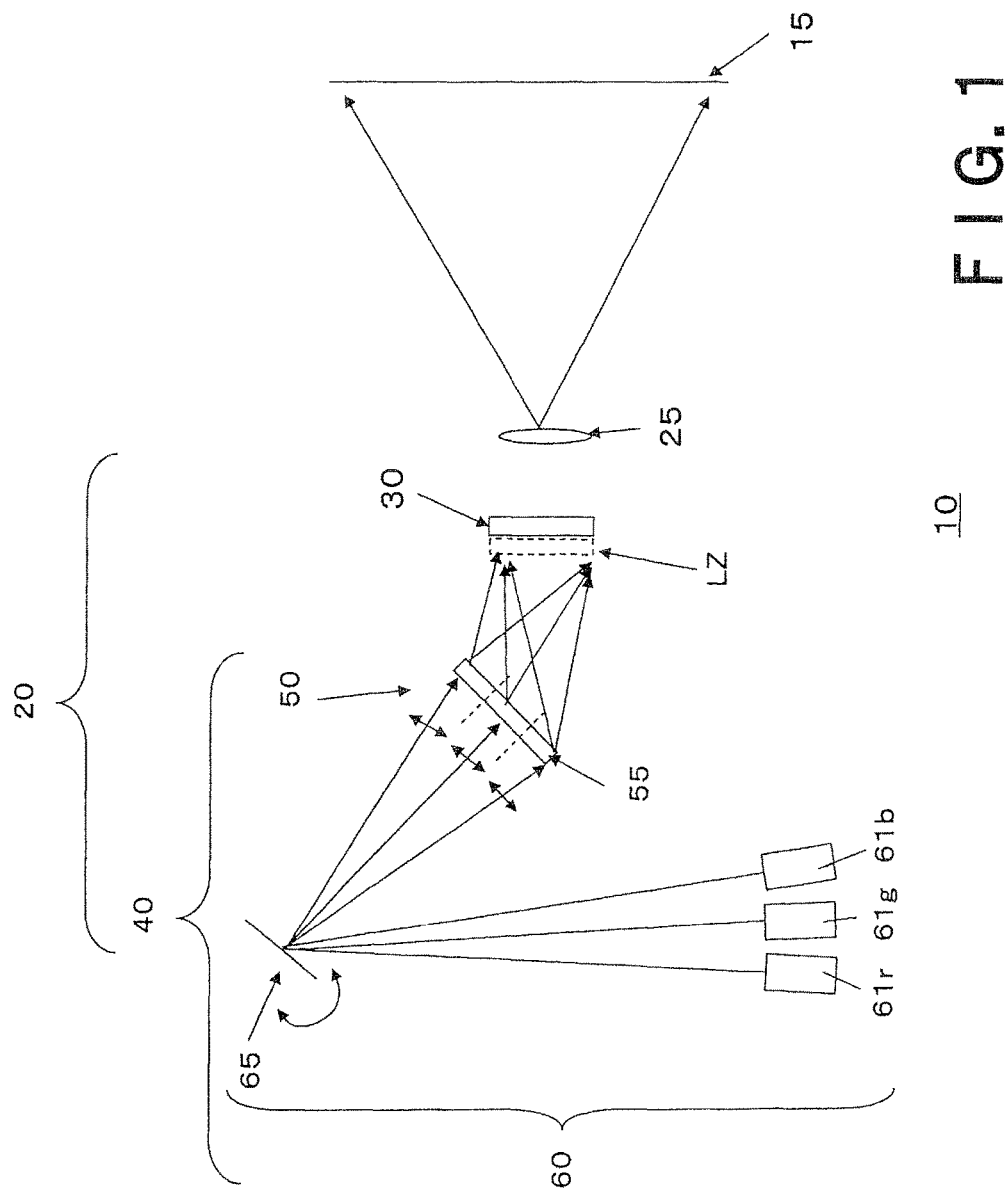
FIG. 1 is a view showing a schematic configuration of a projection-type image display apparatus.

A projection-type image display apparatus 10 shown in FIG. 1 is provided with a screen 15 and a projection apparatus 20 for projecting an image light generated by coherent light beams. The projection apparatus 20 is provided with an illumination device 40 for illuminating an illumination zone LZ located on a virtual plane with coherent light beams, a spatial light modulator 30 that is provided on the location overlapping with the illumination zone LZ and is illuminated with coherent light beams by the illumination device 40, and a projection optical system 25 for projecting coherent light beams from the spatial light modulator 30 onto the screen 15.

As the spatial light modulator 30, for example, a transmission-type liquid crystal microdisplay can be used. In this case, the spatial light modulator 30 is illuminated by the illumination device 40 in the plane direction and coherent light beams passes through the spatial light modulator 30 selectively per pixel. In this way, the spatial light modulator 30 generates a modulated image on a display. The generated modulated image, i.e. an image light, is varied its size by the projection optical system 25 and projected onto the screen 15. In this way, a modulated image is displayed on the screen 15 with a varied size, i.e. usually, magnified, so that an observer can observe the image.

As the spatial light modulator 30, a reflection-type microdisplay can also be used. In this case, a modulated image is generated by reflected light beams at the spatial light modulator 30 so that a plane on the spatial light modulator 30 illuminated with coherent light beams from the illumination device 40 and an emitting plane for light beams of an image, i.e. reflected light beams, of a modulated image generated by the spatial light modulator 30 become the same plane. When utilizing such reflected light beams, it is possible to use a MEMS (Micro Electro Mechanical Systems) device such as a DMD (Digital Micromirror Device) as the spatial light modulator 30. In the apparatus disclosed in Japanese Patent Laid-Open No. 6-208089, a DMD is used as the spatial light modulator.

Moreover, it is preferable that the incidence plane of the spatial light modulator 30 has the same shape and size as the illumination zone LZ that is illuminated with coherent light beams by the illumination device 40. The reason is that coherent light beams from the illumination device 40 can be used for displaying an image on the screen 15 at high utilization efficiency.

The screen 15 may be a transmission-type screen or a reflection-type screen. In the case where the screen 15 is a reflection-type screen, an observer observes an image created by coherent light beams reflected on the screen 15 at the same side as the projection apparatus with respect to the screen 15. On the other hand, in the case where the screen 15 is a transmission-type screen, an observer observes an image created by coherent light beams that have passed through the screen 15 at the opposite side of the projection apparatus with respect to the screen 15.

Coherent light beams projected onto the screen 15 are diffused and recognized by an observer as an image. In this case, the coherent light beams projected onto the screen interfere with one another due to the diffusion, thus generating speckles. However, in the projection-type image display apparatus 10 which is described here, the illumination device 40 which will be described later has a configuration in which the illumination zone LZ overlapped with the spatial light modulator 25 is illuminated with coherent light beams that exhibit angular variation with time. In more specifically, the illumination device 40 which will be described later has a feature in that, although the entire region of the illumination zone LZ is illuminated with diffused light of coherent light beams, the incident angle of diffused light on the illumination zone LZ varies with time. This results in that a diffusion pattern of coherent light beams on the screen 15 also varies with time, so that speckles caused by the diffusion of the coherent light beams become inconspicuous as they are superimposed one another with time. Hereinafter, the illumination device 40 described above will be explained more in detail.

Figure 2:
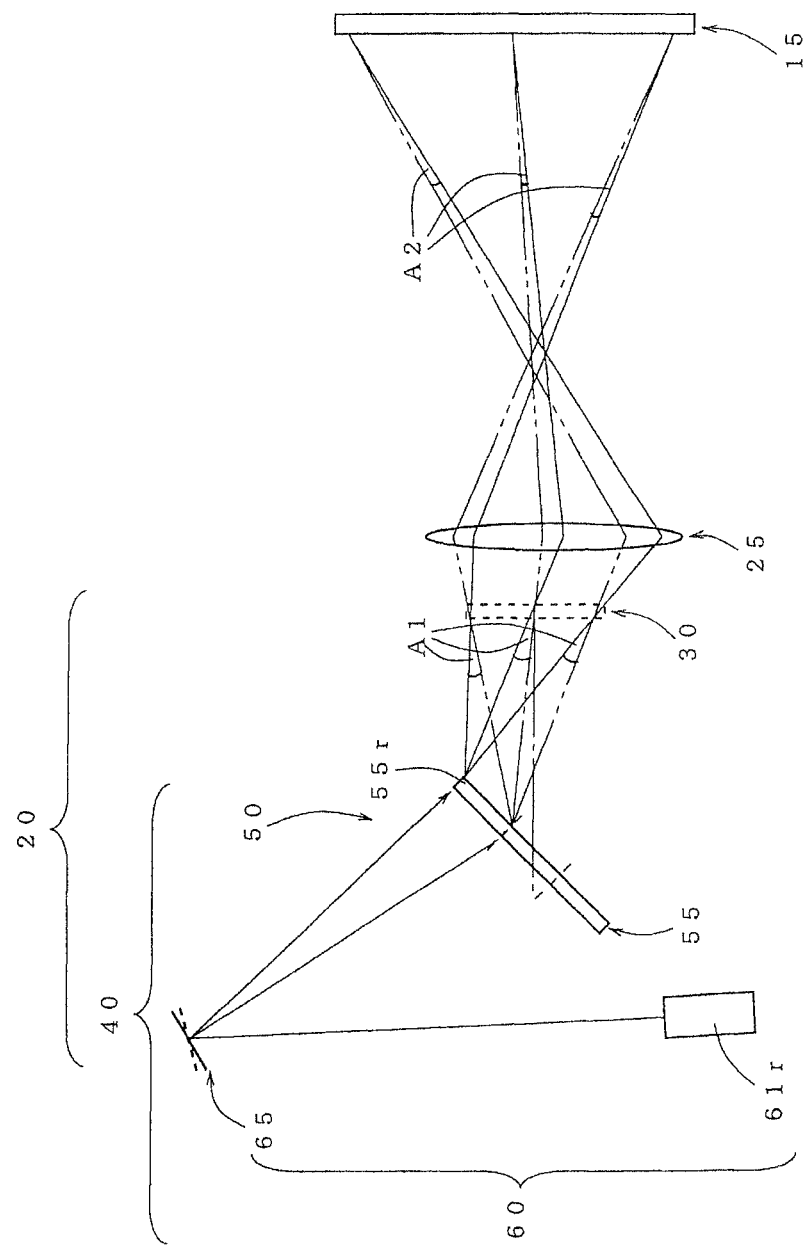
FIG. 2 is a view explaining the operational principle of an illumination device 40 of FIG. 1.

FIG. 2 is a view explaining the operational principle of the illumination device 40 of FIG. 1. In FIG. 2, for the sake of easy explanation, only a part of components in the illumination device 40 is shown. Hereinafter, the basic operational principle of the illumination device 40 of FIG. 1 will be explained using FIG. 2.

The illumination device 40 according to the present embodiment is provided with an optical device 50 that directs a propagation direction of coherent light beams to the illumination zone LZ and an irradiation unit 60 that irradiates the optical device 50 with coherent light beams. The optical device 50 includes a hologram recording medium 55 that can reproduce an image of a scattering plate not shown.

The hologram recording medium 55 can receive coherent light beams emitted from the irradiation unit 60 as reproduction illumination light beams La and diffract the coherent light beams at high efficiency. Above all, the hologram recording medium 55 is configured to be capable of reproducing an image of a scattering plate by diffracting coherent light beams incident on its respective positions, in other words, respective micro zones which should be called respective points.

The irradiation unit 60 is configured so that the optical device 50 uses coherent light beams emitted to the hologram recording medium 55 to scan the hologram recording medium 55. Therefore, a zone on the hologram recording medium 55 illuminated with coherent light beams by the irradiation unit 60 at a moment is a portion of the surface of the hologram recording medium 55, i.e. in the example shown, a micro zone which should be called a point.

Coherent light beams emitted from the irradiation unit 60 to scan the hologram recording medium 55 are incident on respective positions, i.e. respective points or respective zones, on the hologram recording medium 55 at an incident angle that satisfies diffraction requirements of the hologram recording medium 55. Coherent light beams incident on respective positions of the hologram recording medium 55 from the irradiation unit 60 are diffracted by the hologram recording medium 55 to illuminate the zones that are overlapped with one another at least partially. Above all in the embodiment described here, coherent light beams incident on respective positions of the hologram recording medium 55 from the irradiation unit 60 are diffracted by the hologram recording medium 55 to illuminate the same illumination zone LZ. In more detail, as shown in FIG. 2, the coherent light beams incident on respective positions of the hologram recording medium 55 from the irradiation unit 60 reproduce an image of a scattering plate in a manner that the image is superimposed on the illumination zone LZ. Namely, each coherent light beam incident on each position of the hologram recording medium 55 from the irradiation unit 60 is diffused, i.e. spread, by the optical device 50 to be incident on the illumination zone LZ.

As for the hologram recording medium 55 that enables the diffraction of coherent light beams described above, in the example shown, a transmission-type volume hologram using photopolymer is used. FIG. 3 is a view explaining a state in which an image of a scattering plate 6 is generated on the hologram recording medium 55 as interference fringes. Here, the scattering plate 6 is a reference member and it does not matter what a configuration the scattering plate 6 has.

As shown in FIG. 3, the hologram recording medium 55 is produced using scattered light beams from an actual scattering plate 6 as object beams Lo. FIG. 3 shows a state in which a hologram photosensitive material 58 that exhibits photosensitivity to become the hologram recording medium 55 is exposed by reference beams Lr and object beams Lo, both being coherent lights that exhibit coherence to each other.

As for the reference beams Lr, for example, laser beams from a laser source that oscillates laser beams in a specific wavelength range are used. The reference beams Lr pass through a condenser element 7 made of a lens and are incident on the hologram photosensitive material 58. In the example shown in FIG. 3, laser beams to become the reference beams Lr are incident on the condenser element 7 as a parallel light flux that is parallel with the optical axis of the condenser element 7. By passing through the condenser element 7, the reference beams Lr are reshaped, i.e. converted, from a parallel light flux into a convergent light flux and incident on the hologram photosensitive material 58. On this occasion, a focal point FP of the convergent light flux Lr is located at a position beyond the hologram photosensitive material 58. In other words, the hologram photosensitive material 58 is located between the condenser element 7 and the focal point FP of the convergent light flux Lr collected by the condenser element 7.

Next, the object beams Lo are incident on the hologram photosensitive material 58 as scattered light from the scattering plate 6 made of opal glass, for example. In the example shown in FIG. 3, the hologram recording medium 55 to be produced is a transmission type and the object beams Lo are incident on the hologram photosensitive material 58 on the same side as the reference beams Lr. It is a precondition that the object beams Lo are coherent with the reference beams Lr. Therefore, for example, it is possible to separate laser beams oscillated by the same single laser source and use one of the separated ones as the reference beams Lr and the other as the object beams Lo.

In the example shown in FIG. 3, a parallel light flux that is parallel with the direction of normal to the plate surface of the scattering plate 6 is incident on the scattering plate 6 and scattered, and then the scatted beams that have passed through the scattering plate 6 are incident on the hologram photosensitive material 58 as the object beams Lo. According to this method, when an isotropic scattering plate available at low cost is used as the scattering plate 6, the object beams Lo can be easily incident on the hologram photosensitive material 58 at roughly constant intensity distribution. Moreover, according to this method, although depending on the degree of scattering by the scattering plate 6, the reference beams Lr can be easily incident on respective positions of the hologram photosensitive material 58 at roughly constant intensity from the entire region of a light-emitting surface 6a of the scattering plate 6. In such a case, it is achievable that light beams incident on respective positions of the obtained hologram recording medium 55 reproduce images 5 of the scattering plate 6 at similar brightness and reproduced images 5 of the scattering plate 6 are observed at roughly constant brightness.

As described above, when the hologram photosensitive material 58 is exposed by the reference beams Lr and object beams Lo, interference fringes caused by the interference between the reference beams Lr and object beams Lo are generated and interference fringes of these light beams are recorded in the hologram photosensitive material 58 as some form of pattern, i.e. an refractive index modulation pattern, as one example in a volume hologram. Thereafter, an appropriate post-treatment corresponding to the type of the hologram photosensitive material 58 is applied, thereby obtaining the hologram recording medium 55.

FIG. 4 is a view explaining a state in which an image of a scattering plate is reproduced using interference fringes formed in the hologram recording medium 55 obtained through an exposure process of FIG. 3. As shown in FIG. 4, the hologram recording medium 55 produced with the hologram photosensitive material 58 of FIG. 3 meets its Bragg condition by means of light beams that have the same wavelength as the laser beams used in the exposure process and travel in a reverse direction of the reference beams Lr along an optical path of the reference beams Lr. Namely, as shown in FIG. 4, a diverging light flux that diverges from a reference point SP located with respect to the hologram recording medium 55 so as to have the same positional relationship as the relative position of the focal point FP in FIG. 3 with respect to the hologram photosensitive material 58 and that has the same wavelength as the reference beams Lr in the exposure process is refracted by the hologram recording medium 55 as the reproduction illumination light beams La, thereby creating the image 5 of the scattering plate 6 at a specific location with respect to the hologram recording medium 50 so as to have the same positional relationship as the relative position of the scattering plate 6 in FIG. 3 with respect to the hologram photosensitive material 58 in the exposure process.

In this occasion, reproduction beams Lb, i.e. beams obtained by diffracting the reproduction illumination light beams La by the hologram recording medium 55, for creating a reproduced image 5 of the scattering plate 6 reproduce respective points of the image 5 of the scattering plate 6 as beams travelling in the reverse direction of the optical path of the object beams Lo travelled towards the hologram photosensitive material 58 from the scattering plate 6 in the exposure process. Moreover, as described above and as shown in FIG. 3, scattered beams Lo emitted from respective points of the light-emitting surface 6a of the scattering plate 6 in the exposure process are diffused, i.e. spread, to be incident on roughly entire region of the hologram photosensitive material 58. Namely, on respective points of the hologram photosensitive material 58, the object beams Lo from the entire region of the light-emitting surface 6a of the scattering plate 6 are incident. As a result, information of the entire light-emitting surface 6a is recorded at respective points of the hologram recording medium 55. It is therefore possible that beams which constitute a diverging light flux from the reference point SP and function as the reproduction illumination light beams La are incident on respective points of the hologram recording medium 55 to reproduce the images 5 of the scattering plate 5 having the same contour as one another at the same location, i.e. the illumination zone LZ, respectively.

The light beams incident on the hologram recording medium 55 are diffracted in the direction of the illumination zone LZ, hence useless scattered light can be effectively restricted. Therefore, all of the reproduction illumination beams La incident on the hologram recording medium 55 can be effectively used for creating the image of the scattering plate 6.

Next, the configuration of the irradiation unit 60 that emits coherent light beams to the optical device 50 made of the hologram recording medium 55 described above will be explained. In the example shown in FIGS. 1 and 2, the irradiation unit 60 is provided with laser sources 61r, 61g and 61b of three colors each generating coherent light beams and a scanning device 61 that changes the propagation direction of coherent light beams from these laser sources 61.

The laser sources 61r, 61g and 61b emit coherent light beams of different wavelength ranges. Specifically, the laser source 61r emits light in red, the laser source 61g emits light in green, and the laser source 61b emits light in blue. In addition to these three types of laser sources, a laser source having another wavelength range, in other words, emitting light in another color, for example, yellow, may be provided. Moreover, at least one of the laser sources 61r, 61g and 61b may be replaced with a laser source that emits light in another color.

Figure 5:
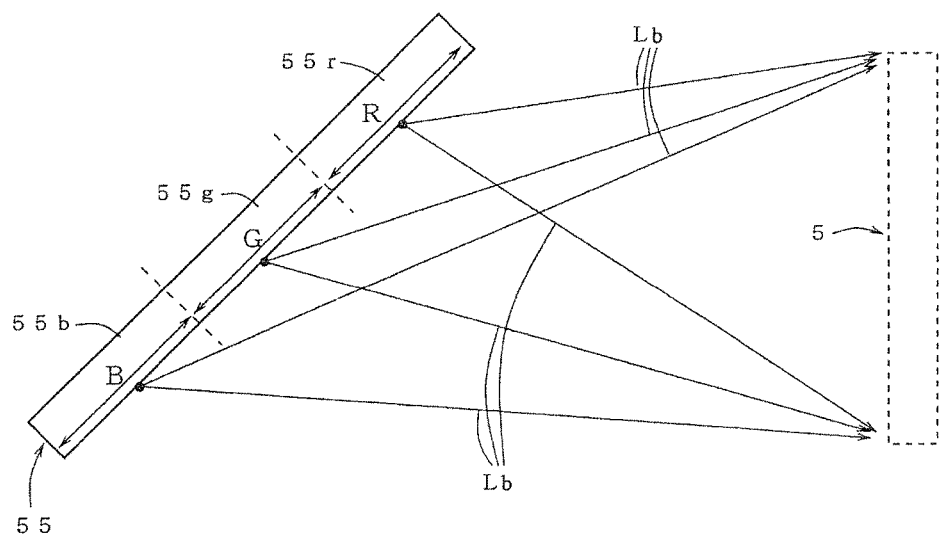
FIG. 5 is a view explaining a structure of the hologram recording medium 55.

The hologram recording medium 55 is, as shown in an enlarged view in FIG. 5, provided with three recording areas 55r, 55g and 55b that correspond to the laser sources 61r, 61g and 61b, respectively. On the recording area 55r, a red coherent light beam from the laser source 61r that is reflected by the scanning device 65 is incident, thereby an image 5 of the scattering plate 6 being created on the entire region of the illumination zone LZ. The scanning device 65 changes a reflection angle of the red coherent light beam from the laser source 61r with time. In response to the change in reflection angle, an illuminating position of the red coherent light beam in the recording area 55r also changes. However, the reflection angle of the scanning device 65 is controlled so that a red coherent light beam from the scanning device 65 is not incident on a position outside the recording area 55r.

In a similar manner, on the recording area 55g, a green coherent light beam from the laser source 61g that is reflected by the scanning device 65 is incident, thereby an image 5 of the scattering plate 6 being created on the entire region of the illumination zone LZ. Moreover, on the recording area 55b, a blue coherent light beam from the laser source 61b that is reflected by the scanning device 65 is incident, thereby an image 5 of the scattering plate 6 being created on the entire region of the illumination zone LZ.

After all, the illumination zone LZ is illuminated with three colors of red, green and blue. In the case where the laser sources 61r, 61g and 61b simultaneously emit coherent light beams, the illumination zone LZ is illuminated with a white color into which these colors are mixed.

The recording areas 55r, 55g and 55b may not always necessarily be tightly arranged but may have a gap therebetween. In this case, coherent light beams reflected by the scanning device 65 are not incident on the gap which, however, poses no problem in practical use. Moreover, the recording areas 55r, 55g and 55b need not have an equal area. When interference fringes are formed in the recording areas 55r, 55g and 55b in a manner that interference fringes are superimposed one another, the amount of refractive index modulation becomes smaller for each of the interference fringes corresponding to the respective colors, which results in different brightness in the illumination zone LZ compared to monochromatic interference fringes. Therefore, it is preferable that the recording areas 55r, 55g and 55b are not overlapped one another.

In order to provide the recording areas 55r, 55g and 55b in the hologram recording medium 55, reference beams Lr and object beams Lo are emitted to the respective recording areas to form interference fringes on the corresponding recording areas, according to the principle of FIG. 3.

Although depending on the characteristics of the laser sources 61r, 61g and 61b, there is a case in which a color much closer to white can be reproduced by providing another laser source, for example, a laser source that emits light in yellow, that emits light in a color other than red, green and blue. Therefore, the type of laser sources provided in the irradiation unit 60 is not limited to any particular type. For example, in the case of providing laser sources of four colors, the hologram recording medium 55 may be partitioned into four regions so as to correspond to the respective laser sources.

The scanning device 65 changes the propagation direction of a coherent light beam with time to direct the coherent light beam in different directions so that the coherent light beam does not travel in the same direction. This results in that the coherent light beam, the propagation direction of which is changed by the scanning device 65, scans the incidence surface of the hologram recording medium 55 of the optical device 50. In the example of FIG. 1, three types of coherent light beams are incident on the scanning device 65 from the laser sources 61r, 61g and 61b. Therefore, the scanning device 65 changes the reflection angle of these coherent light beams with time to scan the incident surfaces of the recording areas 55r, 55g and 55b of the hologram recording medium 55, respectively.

Figure 6:
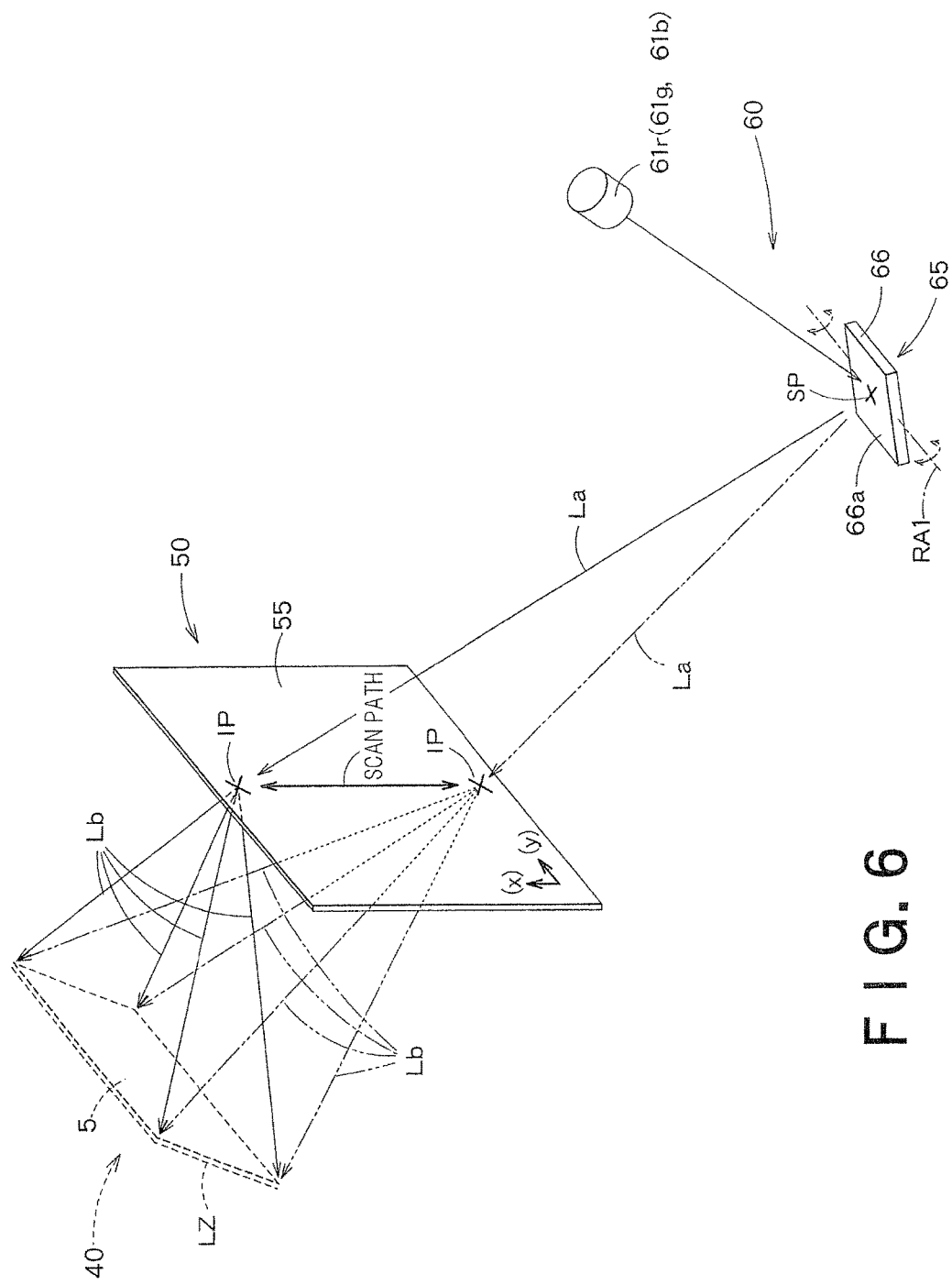
FIG. 6 is a view explaining a scanning route of a scanning device 65.

In the example of FIG. 2, the scanning device 65 includes a reflection device 66 having a reflection surface 66a rotatable about one axis line RA1. FIG. 6 is a view explaining a scanning route of the scanning device 65. As understood from FIG. 6, the reflection device 66 has a mirror device that has a mirror as the reflection surface 66a rotatable about one axis line RA1. The reflection device 66 is configured to change the orientation of the mirror 66a to change the propagation direction of the coherent light beams from the laser sources 61r, 61g and 61b. In this occasion, as shown in FIG. 2, the mirror device 66 is provided so as to receive the coherent light beams from the laser sources 61r, 61g and 61b roughly at the reference point SP.

A coherent light beam that has undergone final adjustments of the propagation direction by the mirror device 66, can be incident on the hologram recording medium 55 of the optical device 50 as a reproduction illumination light beam La that can become one beam of a diverging light flux from the reference point SP in FIG. 4. As a result, coherent light beams from the irradiation unit 60 scan the hologram recording medium 55 and coherent light beams incident on respective positions of the hologram recording medium 55 reproduce images 5 of the scattering plate 6 having the same contour on the same location, i.e. the illumination zone LZ.

As shown in FIG. 6, the mirror device 66 shown in FIG. 2 is configured to rotate the mirror 66a about one axis line RA1. In the example shown in FIG. 6, the rotation axis line RA1 of the mirror 66a extends in parallel with the y-axis of the x-y axis system, that is, the x-y axis system having the x-y plane in parallel with the surface of the hologram recording medium 55, defined on the surface of the hologram recording medium 55. Then, the mirror 66a rotates about the axis line RA1 that is in parallel with the y-axis of the x-y axis system defined on the surface of the hologram recording medium 55. Therefore, an incidence point IP of a coherent light beam from the irradiation unit 60 on the optical device 50 moves in a reciprocating motion in the direction parallel with the x-axis of the x-y axis system defined on the surface of the hologram recording medium 55. Namely, in the example shown in FIG. 7, the irradiation unit 60 emits a coherent light beam to the optical device 50 to scan the hologram recording medium 55 along a straight route.

The scanning device 65 constituted by the mirror device 66 and other components is, as described above, a member rotatable about at least the axis line A1 and configured with a MEMS, for example. The scanning device 65 periodically moves in rotational motion, however, there is no particular limitation on its rotational frequency.

As a practical problem, there is a case where the hologram photosensitive material 58 shrinks when the hologram recording medium 55 is produced. In such a case, it is preferable to adjust the recording angles of coherent light beams to be entered to the optical device 50 from the irradiation unit 60 under consideration of the shrinkage of the hologram photosensitive material 58. The wavelengths of coherent light beams generated by the laser sources 61r, 61g and 61b do not need to be precisely the same as the wavelength of the light beam used in the exposure process, recording process, of FIG. 3 but may be roughly the same.

In a similar reason, even if the propagation direction of a light beam to be incident on the hologram recording medium 55 of the optical device 50 does not take precisely the same route as one beam included in a diverging light flux from the reference point SP, an image 5 can be reproduced in the illumination zone LZ. Actually, in the examples shown in FIGS. 2 and 6, the mirror, i.e. reflection plane 66a of the mirror device 66 composing of the scanning device 65 is inevitably displaced from its rotational axis line RA1. Therefore, in the case where the mirror 66a is rotated about the rotational axis line RA1 that does not pass through the reference point SP, it happens that a light beam to be incident on the hologram recording medium 55 is not one of the beams that constitute a diverging light flux from the reference point SP. However, practically, an image 5 can be substantially reproduced in a manner that the image 5 is superimposed on the illumination zone LZ by means of coherent lights from the irradiation unit 60 having the shown configuration.

Effects of Basic Embodiment

Next, the functions of the illumination device 40, the projection apparatus 20 and the projection-type image display apparatus 10 having the configurations described above will be explained.

Firstly, the irradiation unit 60 emits coherent light beams to the optical device 50 so as to scan the hologram recording medium 55 of the optical device 50. Specifically, the laser sources 61r, 61g and 61b generate coherent light beams having a specific wavelength that travel along a unidirection. These coherent light beams are emitted to the same reference point on the scanning device 65 to change their respective propagation directions. More specifically, the coherent light beams travel towards the hologram recording medium 55 at reflection angles in accordance with incident angles from the laser sources 61r, 61g and 61b, respectively.

The scanning device 65 makes coherent light beams of a specific wavelength incident on specific positions in respective recording areas on the hologram recording medium 55 at an incident angle that meets the Bragg condition on the respective positions. As a result, the coherent light beams incident on the specific positions in the respective recording areas reproduce images 5 of the scattering plate 6 in a manner that the images 5 are superimposed one another on the entire region of the illumination zone LZ by diffraction caused by interference fringes recorded in the hologram recording medium 55. Namely, the coherent light beams incident on specific positions in respective recording areas are diffused, i.e. spread, by the optical device 50 to be incident on the entire region of the illumination zone LZ. In this way, the irradiation unit 60 illuminates the illumination zone LZ with coherent light beams. As described above, the laser sources 61r, 61g and 61b emit light in different colors, and hence images 5 of the scattering plate 6 are reproduced on the illumination zone LZ in respective colors. Therefore, in the case where the laser sources 61r, 61g and 61b emit light simultaneously, the illumination zone LZ is illuminated with a white color that is a mixture of three colors.

The position of incidence of coherent light beams from the scanning device 65 is shifted with time in each recording area by the operation of the scanning device 65.

As shown in FIG. 1, in the projection apparatus 20, the spatial light modulator 30 is provided at the location overlapping with the illumination zone LZ. Therefore, the spatial light modulator 30 is illuminated by the illumination device 40 in the plane direction so that coherent light beams are selectively passed through per pixel to create an image. This image is projected onto the screen 15 by the projection optical system 25. The coherent light beams projected onto the screen 15 are diffused and recognized by an observer as an image. Nevertheless, the coherent light beams projected onto the screen 15 interfere with one another due to the diffusion to generate speckles.

However, according to the illumination device 40 in the basic embodiment described here, speckles become inconspicuous very effectively, as explained below.

According to Speckle Phenomena in Optics, Joseph W. Goodman, Roberts & Co., 2006 cited above, it is effective to integrate parameters such as polarization, phase, angle and time to increase modes. The modes here are speckle patterns with no correlation one another. For example, in the case where coherent light beams are projected onto the same screen in different directions from a plurality of laser sources, modes exist in the same number as the laser sources. Moreover, in the case where coherent light beams are projected onto a screen in different directions intermittently from the same laser source, modes exist by the number of changes in the incidence direction of the coherent light beams during the time that is not covered by the resolution of human eyes. It is assumed that, in the case where there are many of this mode, the interference patterns of light are superimposed and averaged with no correlation, and as a result, speckles observed by eyes of an observer are inconspicuous.

In the irradiation unit 60 described above, coherent light beams are emitted to the optical device 50 to scan the hologram recording medium 55. Although coherent light beams incident on respective locations of the hologram recording medium 55 illuminate the entire region of the same illumination zone LZ, the illuminating direction of the coherent light beams to illuminate the illumination zone LZ are different from one another. And, since the position on the hologram recording medium 55 on which a coherent light beam is incident changes with time, the incidence direction of the coherent light beam on the illumination zone LZ also changes with time.

When considering the illumination zone LZ as the reference, a coherent light beam is always incident on each location of the illumination zone LZ, however, its incidence direction always changes within a range of angle indicated by A1 in FIG. 2. As a result, a light beam that makes up each pixel of an image created by light passing through the spatial light modulator 30 is projected onto a specific position of the screen 15 while changing its optical path with time within a range of angle indicated by A2 in FIG. 2.

A coherent light beam continuously scans the hologram recording medium 55. Following to this, the incidence direction of a coherent light beam to the illumination zone LZ from the irradiation unit 60 also continuously changes and the incidence direction of a coherent light beam to the screen 15 from the projection apparatus 20 also continuously changes. When the incidence direction of a coherent light beam to the screen 15 from the projection apparatus 20 changes slightly, for example, an angle less than 1°, a speckle pattern generated on the screen 15 changes greatly, resulting in superimposition of speckle patterns with no correlation. In addition, the frequency of a scanning device 65 such as a MEMS mirror and a polygonal mirror actually on the market is usually several hundred Hz or higher and a scanning device 65 of frequency reaching several ten thousands Hz is not rare.

Accordingly, according to the basic embodiment described above, the incidence direction of a coherent light beam changes with time on each location on the screen 15 that is displaying an image and this change occurs at a speed that is not covered by the resolution of human eyes. As a result, scattering patterns of coherent light beams with no correlation are superimposed and observed by human eyes. Therefore, speckles generated corresponding to respective scattering patterns are superimposed and observed by an observer. Accordingly, speckles become inconspicuous effectively to an observer who observes an image displayed on the screen 15 that is displaying an image.

Conventionally, speckles observed by humans are not only speckles at the screen side caused by the scattering of coherent light beams on the screen 15 but also speckles at the projection apparatus side that could occur due to the scattering of coherent light beams before projection onto the screen. The speckle pattern generated at the projection apparatus side is also recognizable to an observer by being projected onto the screen 15 via the spatial light modulator 30. However, according to the basic embodiment described above, coherent light beams continuously scan the hologram recording medium 55 and each of the coherent light beams incident on respective locations on the hologram recording medium 55 illuminates the entire region of the illumination zone LZ on which the spatial light modulator 30 is provided. Namely, the hologram recording medium 55 creates new wavefronts different from the prior wavefronts that have formed speckle patterns, thereby illuminating the screen 15 in a complex manner and uniformly via the illumination zone LZ and further the spatial light modulator 30. By the creation of new wavefronts at the hologram recording medium 55, speckle patterns generated at the projection apparatus side become invisible.

In Speckle Phenomena in Optics, Joseph W. Goodman, Roberts & Co., 2006 mentioned above, a method using a numerical value corresponding to a speckle contrast as a parameter to indicate the degree of speckles generated on a screen is proposed. The speckle contrast is the quantity defined as a value obtained by dividing the standard deviation of variation in intensity actually occurred on a screen by an average value of the intensity when a test-pattern image to originally exhibit uniform intensity distribution is displayed. A larger value of the speckle contrast means a larger degree of generation of speckles on a screen and indicates to an observer that a spotted luminance-unevenness pattern is more remarkable.

According to the experiments by the inventor of the present invention, the measurements of the speckle contrast show that a speckle contrast was 3.0%, hereinafter called Condition 1, for an projection-type image display apparatus according to the basic embodiment configured with a single laser source and a reflection-type volume hologram. In addition, instead of the reflection volume hologram, when a relief hologram was used as the optical device 50 described, as a computer-generated hologram (CGH) having a convex-concave shape designed using a computer so as to reproduce the image 5 of the scattering plate 6 when receiving a specific reproduction illumination light beam, a speckle contrast was 3.7%, hereinafter called Condition 2. In an HDTV (high definition TV) display application, a speckle contrast of 6.0% or less is set as the standard as level at which an observer cannot almost recognize a luminance-unevenness pattern through visual observation, for example, refer to WO/2001/081996. The basic embodiment described above fully satisfies the standard. Moreover, in actual visual observation, luminance unevenness, i.e. brightness unevenness, did not occur to a degree that it can be visually perceived.

On the other hand, when laser beams from a laser source were shaped into a parallel light flux and incident on the spatial light modulator 30, that is, when coherent light beams from a single laser source were incident on the spatial light modulator 30 of the projection-type image display apparatus 10 shown in FIG. 1 as a parallel light flux without via the scanning device 65 and the optical device 50, a speckle contrast was 20.7%, hereinafter called Condition 3.

Under this condition, spotted luminance-unevenness patterns were very conspicuously observed through visual observation.

In addition, when the laser source was replaced with a green LED being an incoherent light source and light beams from this LED light source were incident on the spatial light modulator 30, that is, when incoherent light beams from the LED light source were incident on the spatial light modulator 30 of the projection-type image display apparatus 10 shown in FIG. 1 as a parallel light flux without via the scan device 65 and the optical device 50, a speckle contrast was 4.0%, hereinafter called Condition 4. Under this condition, luminance unevenness, i.e. brightness unevenness, to a degree that it can be perceived through visual observation did not occur.

The results of Conditions 1 and 2 are much better than the result of Condition 3 and are also better than the measurement result of Condition 4. As discussed above, the problem of generation of speckles is practically a problem unique to the case of using a coherent light source of a laser beam or the like, and thus, the problem needs not be considered in the case of an apparatus using an incoherent light source such as an LED. In addition, in comparison with Condition 4, in Conditions 1 and 2, the optical device 50 which may cause generation of speckles is added. In view of these points, it can be said that the speckle defect was dealt with sufficiently according to Conditions 1 and 2.

In addition, according to the basic embodiment described above, the following advantages can be obtained.

According to the basic embodiment described above, the optical device 50 for making speckles inconspicuous can also function as an optical member for shaping and adjusting the beam shape of a coherent light beam emitted from the irradiation device 60. Therefore, it is possible to miniaturize and simplify the optical system.

Moreover, according to the basic embodiment described above, coherent light beams incident on respective recording areas of the hologram recording medium 55 create images of the scattering plate 6 in respective colors on the entire region of the illumination zone LZ and the spatial light modulator 30 is provided so that it is overlapped with the image 5. Therefore, it is possible to utilize all of the light beams diffracted by the hologram recording medium 55 for image creation, thus improving utilization efficiency of light beams from the laser sources 61r, 61g and 61b.

Mode of Coherent Light Beam Emitting Direction

In FIG. 1, coherent light beams from the laser sources 61r, 61g and 61b are converged on one point of the scanning device 65. Therefore, the area of the mirror surface of the scanning device 65 can be smaller, the weight of the scanning device 65 can be lighter, and power consumption needed for rotation of the scanning device 65 can be smaller. Nevertheless, since coherent light beams from the laser sources 61r, 61g and 61b are converged on one point, intense light is emitted to specific portions of the mirror surface. Therefore, there is a problem concerning durability in that the life of the scanning device 65 becomes shorter. For this reason, a technique of scattering coherent light beams emitted to the mirror surface of the scanning device 65 is also considered.

Figure 7:
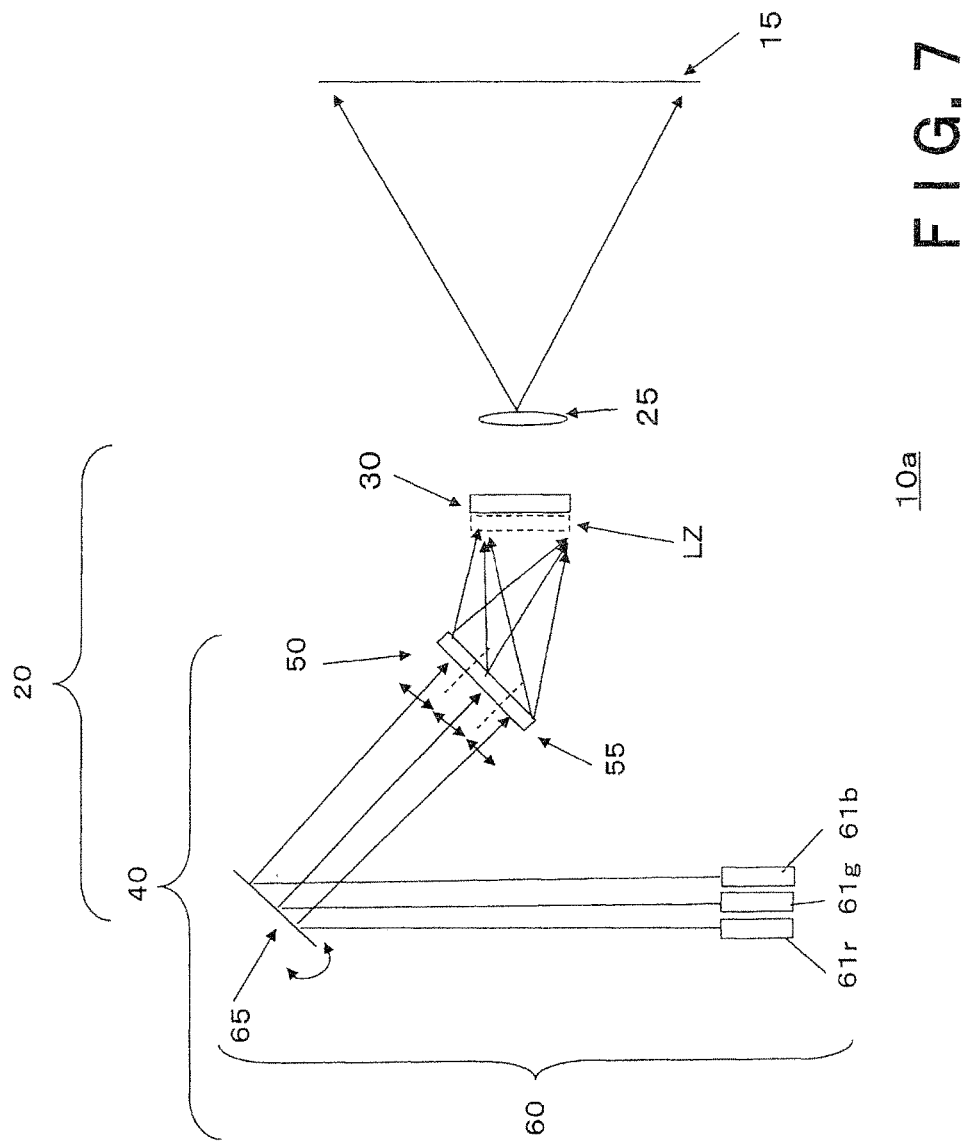
FIG. 7 is a view showing a modification of FIG. 1.

FIG. 7 is a view showing one example of a projection-type image display apparatus 10a in which coherent light beams emitted from laser sources 61r, 61g and 61b are incident on a scanning device 65 as parallel beams and coherent light beams reflected by a scanning device 65 are incident on a hologram recording medium 55 as diverging beams.

In the projection-type image display apparatus 10a of FIG. 7, coherent light beams emitted from laser sources 61r, 61g and 61b are incident on three positions of the scanning device 65 and the coherent light beams are reflected from the respective positions towards the hologram recording medium 55.

As described above, since the scanning device 65 performs a rotary motion, the reflection angle of each reflected coherent light beam also changes in accordance with the rotary motion. However, the parallel state of the three types of reflected coherent light beams remain unchanged. Therefore, on the recording areas 55r, 55g and 55b of the hologram recording medium 55, the corresponding reflected coherent light beams are incident.

Accordingly, in the projection-type image display apparatus 10a of FIG. 7, reflected beams of a light flux incident on the scanning device 65 in parallel are guided to the hologram recording medium 55. Therefore, it is required to partition the hologram recording medium 55 into three regions and provide three reference beams Lr of a converged light flux to be emitted to the respective three regions, instead of the converged light flux shown in FIG. 3, as reference beams Lr to be used for forming interference fringes on the hologram recording medium 55 beforehand.

Moreover, as described above, coherent light beams emitted to the mirror surface of the scanning device 65 are scattered so that intense light is not emitted to specific positions of the mirror surface, thus the durability of the scanning device 65 is improved.

Furthermore, it is easier to arrange the laser sources 61r, 61g and 61b so that coherent light beams therefrom become parallel beams, instead of converging coherent light beams from the respective laser sources on one point as shown in FIG. 1. Therefore, the apparatus of FIG. 7 is superior to the apparatus of FIG. 1 in terms of adjustments, and the like.

However, it is required for the apparatus of FIG. 7 to have a larger mirror surface than in the case of FIG. 1 where three types of coherent light beams are converged on one point of the mirror surface. Therefore, due to the increase in size of the scanning device 65, power consumption could also be increased in the apparatus of FIG. 7.

Figure 8:
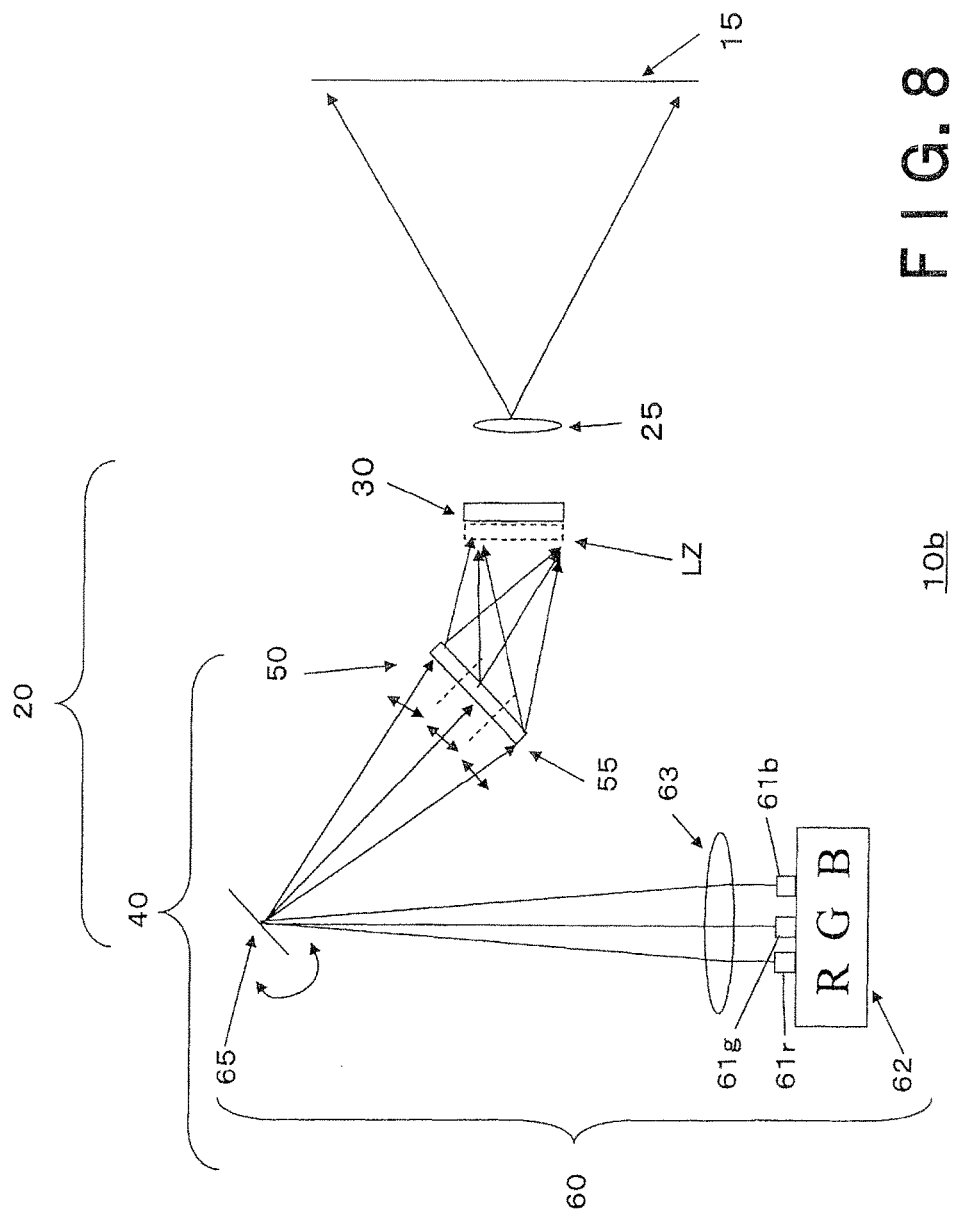
FIG. 8 is a view showing another modification of FIG. 1.

On the contrary, FIG. 8 is a view showing one example of a projection-type image display apparatus 10b using a laser array 62 having laser sources 61r, 61g and 61b of three colors incorporated into one chip, as a light source. Since the laser sources 61r, 61g and 61b in the laser array 62 emit coherent light beams in a parallel direction, a convergence lens 63 is provided as a convergent optical system to converge these coherent light beams on the same point of the scanning device 65. Therefore, the apparatus of FIG. 8 uses the same type of a hologram recording medium 55 as the apparatus of FIG. 1 and the configuration of the projection optical system of the apparatus of FIG. 8 is the same as the apparatus of FIG. 1.

In the apparatus of FIG. 8, by using the laser array 62, the positioning of the laser sources 61r, 61g and 61b becomes easy, so that the variation in optical path between the devices is restricted.

Figure 9:
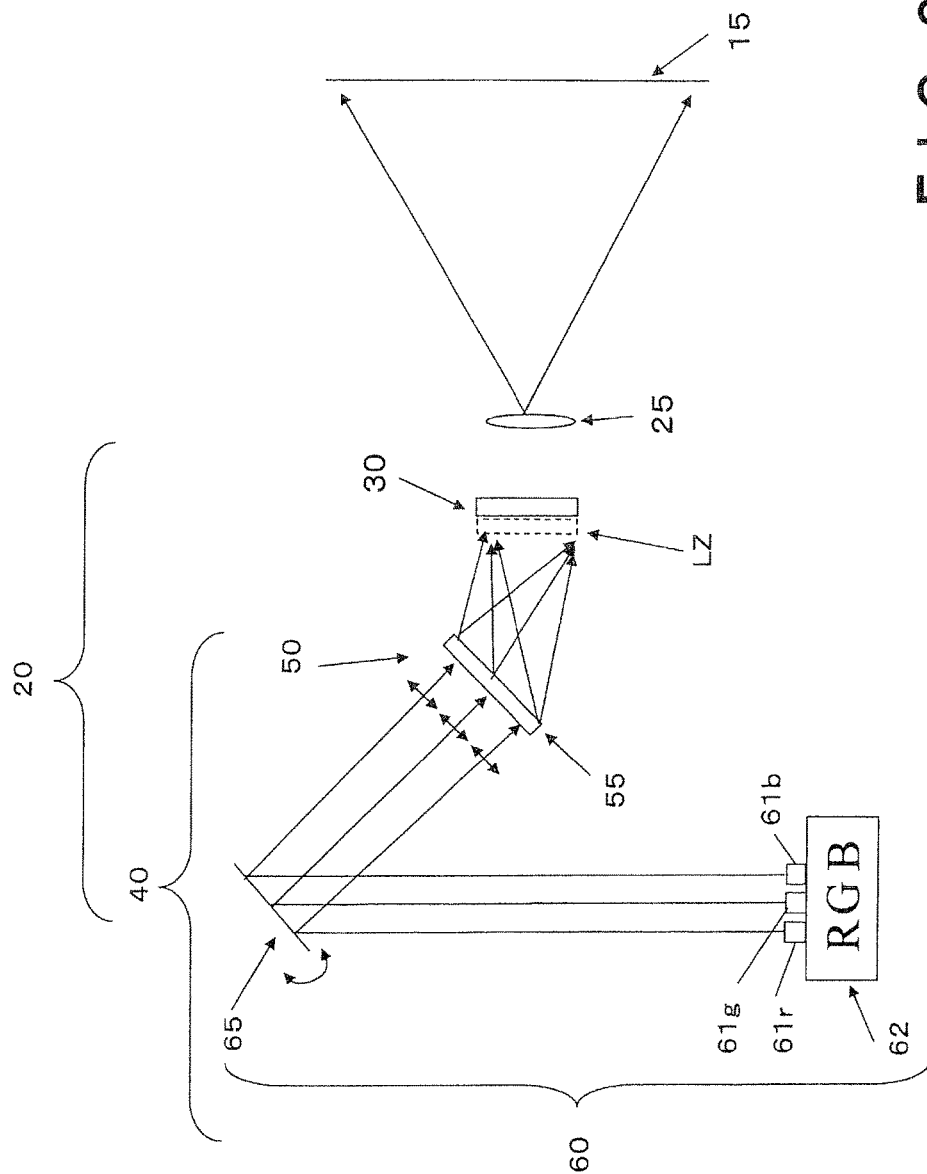
FIG. 9 is a view showing another modification of FIG. 1.

FIG. 9 is a view showing one example of a projection-type image display apparatus 10c in which parallel coherent light beams from a laser array 62 are directly incident on a scanning device 65 and beams reflected from the scanning device 65 are incident on a hologram recording medium 55. The optical path of coherent light beams in FIG. 9 is the same as in FIG. 7, so that there are the same advantages and disadvantages as in FIG. 7. The positioning of the laser sources 61r, 61g and 61b is easier in FIG. 9 than in FIG. 7 just as much as the use of the laser array 62.

Figure 10:
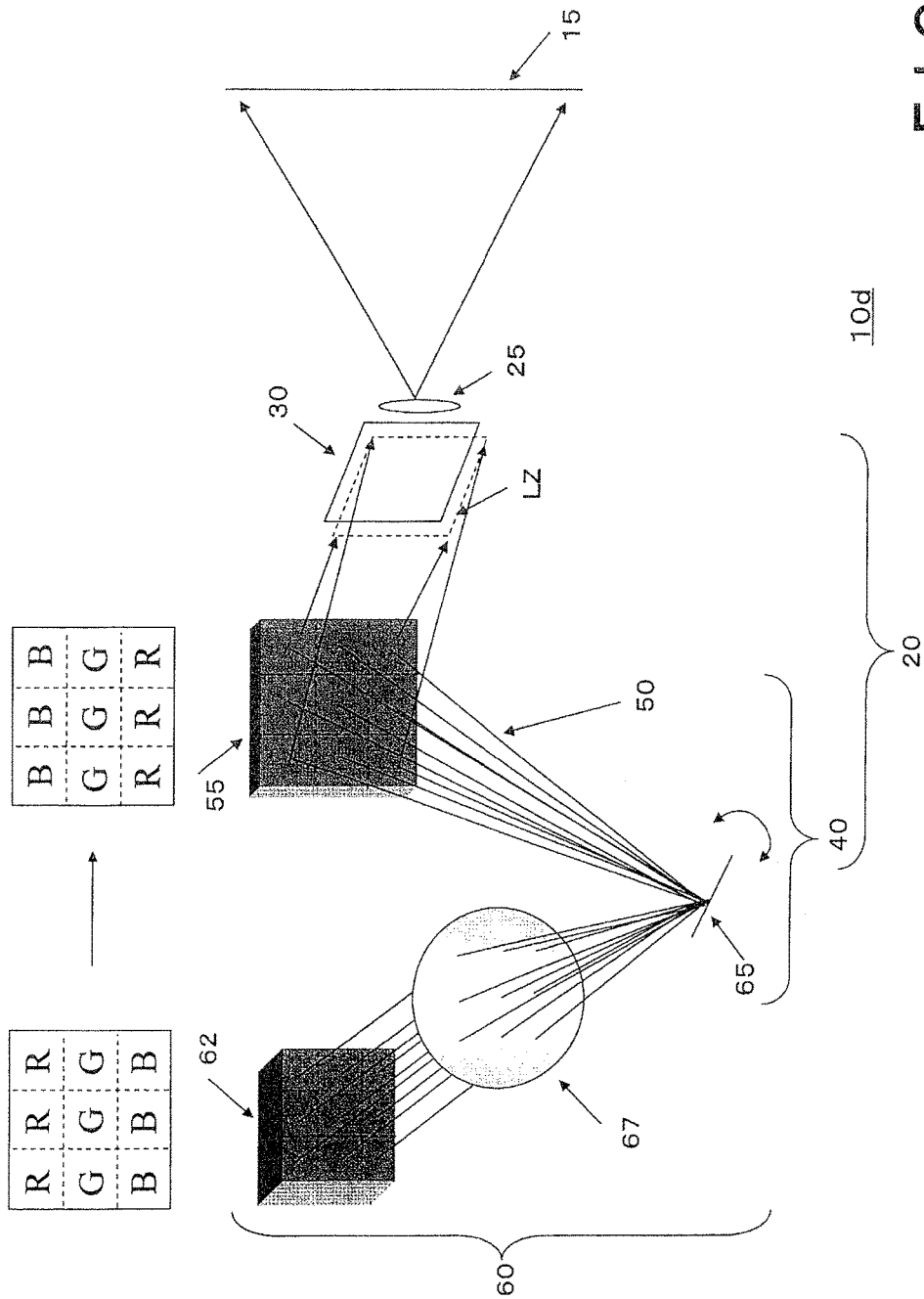
FIG. 10 is a view showing another modification of FIG. 1.

FIG. 10 is a view showing one example of a projection-type image display apparatus 10d configured using a two-dimensional laser array 62 having laser arrays 61r, 61g and 61b arranged in a longitudinal direction each with single-color laser sources arranged in a lateral direction. Coherent light beams emitted from these laser sources pass through a convergence lens 67 as a convergent optical system and are converged on the same point of a scanning device 65. The scanning device 65 reflects these coherent light beams at an angle in accordance with the incident angle of the coherent light beams, so that the coherent light beams are incident on nine recording areas provided on a hologram recording medium 55. The coherent light beams from the nine laser sources are used for scanning in the corresponding recording areas by the scanning device 65.

As shown in FIG. 10, since coherent light beams are reflected at the scanning device 65, the color arrangement of the laser array 62 and that of the recording areas of the hologram recording medium 55 are made symmetrically with each other in a diagonal direction.

In the apparatus of FIG. 10, compared with the apparatuses of FIG. 1 and other figures, the number of laser sources to be used is three times larger. Therefore, it is possible to illuminate the illumination zone LZ brighter just as much as the number of laser sources, thus easily achieving higher illumination intensity.

In the case where the reflection characteristics of a screen, i.e. the intensity distribution of reflected beams depending on an incident angle, is not uniform, light beams of RGB colors are incident from a variety of directions, so that it is rare that observers visually recognize color shading. It is thus possible to suppress color shading or the like of colors displayed on a screen by preliminarily adjusting or randomizing the color arrangement of the laser sources of the laser array 62.

For example, FIG. 11(a) shows an example of an ordinary arrangement of the laser array 62 in which laser sources of red, green and blue are arranged in a longitudinal direction. Contrary to this, FIG. 11(b) shows an example of an arrangement of the laser array 62 in which laser sources are randomly arranged entirely concerning colors. As described above, the color arrangement of recording areas of the hologram recording medium is made symmetrical in a diagonal direction. Therefore, in the case of FIG. 10(b), the color arrangement of recording areas is also random, so that color shading of colors displayed on a screen can be suppressed.

Avoidance of Zero-Order Light

Part of coherent light beams from the irradiation unit 60 is not diffracted by the hologram recording medium 55 but passes through it. This type of light is called zero-order light. When zero-order light is incident on the illumination zone LZ, an abnormal region, i.e. a spotted region, a line region, and a plane region, inevitably appears in which brightness, i.e. intensity, is rapidly increased compared with the surroundings.

When the reflection-type hologram recording medium 55 is used, the spatial light modulator 30 and the projection optical system 25 are not arranged in a propagation direction of zero-order light, hence it is relatively easy to avoid zero-order light. However, when the transmission-type hologram recording medium 55 such as shown in FIGS. 1 and 2 is used, it is highly likely that the spatial light modulator 30 and the projection optical system 25 are arranged in a propagation direction of zero-order light, hence care must be taken.

For example, when compared with FIG. 1, in the configuration of FIG. 2, even if zero-order light passes through the hologram recording medium 55, the spatial light modulator 30 and the projection optical system 25 are not provided in its direction. Therefore, it is highly likely that the zero-order light is avoided. However, in the configuration of FIG. 1, since the optical path of coherent light beams reflected by the scanning device 65 changes, zero-order light may pass through the spatial light modulator 30 and the projection optical system 25. For this reason, even in the case where the configuration of FIG. 1 is employed, it is required to design the location of the scanning device 65, the spatial light modulator 30, and the projection optical system 25 so as to be arranged in accordance with the propagation path of zero-order light so that the zero-order light does not pass through the spatial light modulator 30 and the projection optical system 25.

Emission Timing of Laser Source

The laser sources 61r, 61g and 61b shown in FIG. 1 and other drawings may emit coherent light beams simultaneously or successively. When these laser sources 61r, 61g and 61b emit coherent light beams simultaneously, the respective colors are mixed one another, so that the illumination zone LZ is illuminated with a white color. In this case, by providing a microdisplay corresponding to the spatial light modulator 30 disposed in the illumination zone LZ with a color filter that passes through only a specific color for each pixel, full-color display is achieved.

On the other hand, when the three-color laser sources 61r, 61g and 61b emit coherent light beams successively, the illumination color for the illumination zone LZ changes successively, for example, in order of red→green→blue. Therefore, full-color display is achievable without a color filter. In this case, for example, a microdisplay performs drawing of one-frame red pixels while the illumination color is red for the illumination zone LZ, then performs drawing of one-frame green pixels while the illumination color is green for the illumination zone LZ, and lastly, performs drawing of or one-frame blue pixels while the illumination color is blue for the illumination zone LZ. This successive drawing process is performed several ten times for one second, for example.

When the three-color laser sources 61r, 61g and 61b emit coherent light beams successively, it is not required to provide a color display with a color filter. Therefore, the intensity of the color display can be enhanced further, so that an image can be displayed on the screen 15 more sharply. In addition, the light intensity of the laser sources 61r, 61g and 61b can be lowered under consideration of no light absorption at a color filter, so that the improvement in durability and power consumption can be achieved.

On the other hand, when the three-color laser sources 61r, 61g and 61b emit coherent light beams simultaneously, although it is required to provide a color display with a color filter, it is not required to synchronize the emission control of the laser sources and the display control of the microdisplay. Therefore, the configuration of a control circuit for performing the emission control of the laser sources and the display control of the microdisplay can be simplified.

Structure of Hologram Recording Medium

The hologram recording medium 55 explained with reference to FIG. 1 and other drawings has three recording areas 55r, 55g and 55b corresponding to the respective colors of the laser sources 61r, 61g and 61b. These three recording areas have interference fringes corresponding to the respective colors recorded therein in the plane direction by multiple recording. In this case, it is required to adjust the film thickness and the amount of refractive index modulation Δn of the hologram recording medium 55 so that, at a designed incident angle of a coherent light beam of each color, the diffraction condition of coherent light beams of another color, i.e. wavelength range, does not influence the diffraction condition of the coherent light beam of each color, namely, wavenumber spectra of the coherent light beams when diffracted do not interfere with one another.

Figure 12:
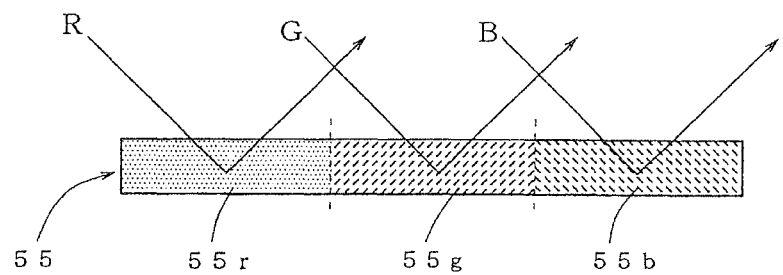
FIG. 12 is a view explaining a structure of the hologram recording medium 55.

Although FIG. 12 shows multiple recording of a refraction-type hologram recording medium 55, a transmission-type hologram recording medium 55 may be used as shown in FIG. 1 and other drawings.

Figure 13:
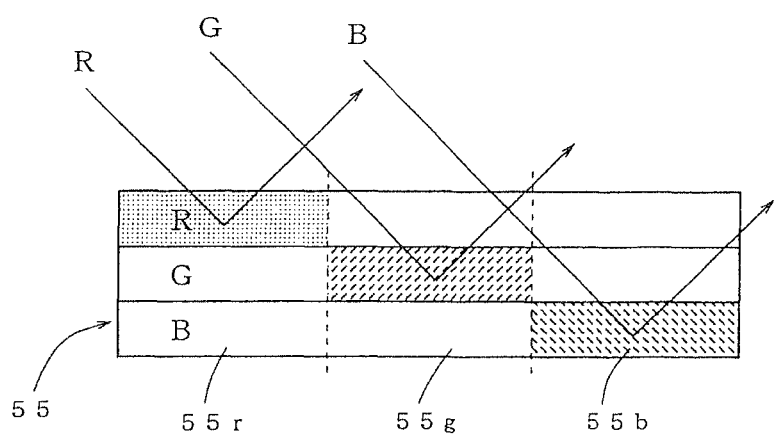
FIG. 13 is a view indicating a modification of FIG. 12.

Or, as shown in FIG. 13, the hologram recording medium 55 may be configured to be a layered structure to diffract specific colors at respective layers. In an example of FIG. 13, a layer 55r for red, a layer 55g for green, and a layer 55b for blue are stacked from up to down. Therefore, interference fringes are recorded on each layer so that a coherent light beam of each color, i.e. each wavelength range, interfere with one another.

In the example of FIG. 13, like FIG. 12, each of the layers 55r, 55g and 55b is partitioned into three recording areas in the plane direction of the hologram recording medium 55, the recording areas actually used for reproducing an image of a scattering plate are the areas given oblique lines. Therefore, in forming interference fringes for each layer, it is enough to form interference fringes in the areas given oblique lines only.

Nonetheless, without partitioning into three recording areas in the plane direction, interference fringes may be formed in the entire region of each layer for use of the entire region in the plane direction on purpose of reproducing an image of a scattering plate.

Reflection- and Transmission-Type Hologram Recording Media

Reflection-type hologram recording media, hereinafter, "reflection-type holograms", exhibit higher wavelength selectivity than transmission-type hologram recording media, hereinafter, "transmission-type holograms". In other words, in reflection-type holograms, although interference fringes corresponding to different wavelengths are superimposed one another in layers, a coherent light beam having a desired wavelength can be diffracted by a desired layer only. In addition, reflection-type holograms are excellent in that the influence of zero-order light can be easily removed.

On the other hand, although transmission-type holograms have a wide spectrum range for diffraction and a high acceptable level to laser sources, if interference fringes corresponding to different wavelengths are superimposed one another in layers, layers other than a desired layer also diffract coherent light of a desired wavelength. Therefore, in general, it is difficult to configure transmission-type holograms in a layered structure.

Modification of Basic Embodiment

The basic embodiment described above based on one specific example exemplified in FIGS. 1 to 6 can be modified in various forms. Hereinafter, an example of modification will be described with reference to the drawings. In the drawings used for the description hereinafter, the components corresponding to those of the embodiments described above are denoted by the same reference numerals, and the description thereof is omitted.

Illumination Device

According to the embodiments described above, it is possible to effectively making speckles inconspicuous. However, the effect is mainly caused by the illumination device 40. Therefore, the illumination device 40 can be used in a variety of modes. For example, the illumination device 40 can be used for illumination merely. In this case, it is possible to reduce brightness unevenness, i.e. luminance unevenness and flicker. For example, in the configuration of FIG. 1, it has the laser sources 61r, 61g and 61b that emit light beams in three colors, and hence an illumination device 40 of white light can be realized by exciting these laser sources simultaneously. Or an illumination device 40 can be realized that can switch illumination color at various timing by exciting the laser sources 61r, 61g and 61b successively or selectively.

Moreover, since white light is obtained by exciting the laser sources 61r, 61g and 61b simultaneously, the white light may be used in illumination for a scanner, for example, an image reader. In such an example, by placing an object to be scanned on the illumination zone LZ for the illumination device 40, speckles generated on the object can be inconspicuous. As a result, it can be possible to eliminate an image correction means or the like conventionally needed.

When the illumination device 40 is incorporated in a scanner, the illumination zone LZ for the illumination device 40 may be a plane, like the embodiments described above. Or the illumination zone LZ for the illumination device 40 may be a long and narrow zone, i.e. a zone which can be called line-like, extending in one direction. In this case, a two-dimensional image can be read by moving the illumination device 40 incorporated in a scanner relative to an object in a direction that orthogonal to the one direction.

Moreover, as shown in FIG. 14, the optical device 50 may include a plurality of hologram recording media 55-1, 55-2, . . . that are arranged in a manner that they are aligned so as not to be overlapped with one another. The hologram recording media 55-1, 55-2, . . . shown in FIG. 14 are formed into a strip-like shape and are arranged in a manner that they are aligned with no gap between one another in a direction vertical to their longitudinal directions. The hologram recording media 55-1, 55-2, . . . are located on the same imaginary plane. The hologram recording media 55-1, 55-2, . . . form images 5 of the scattering plate 6 in respective illumination zones LZ-1, LZ-2, . . . that are arranged in a manner that they are aligned so as not to be overlapped with one another. In other words, the illumination zones LZ-1, LZ-2, . . . are illuminated with coherent light beams. The illumination zones LZ-1, LZ-2, . . . are formed into a long and narrow zone, i.e. a zone which can be called line-like, and are arranged in a manner that they are aligned with no gap between one another in a direction vertical to their longitudinal directions. The illumination zones LZ-1, LZ-2, . . . are located on the same imaginary plane.

In the example shown in FIG. 14, the illumination zones LZ-1, LZ-2, . . . may be illuminated, as follows. Firstly, the irradiation unit 60 emits a coherent light beam to the first hologram recording medium 55-1 so that the coherent light beam repeatedly scan the first hologram recording medium 55-1 along a path in the longitudinal direction, i.e. the one direction described above, of the first hologram recording medium 55-1. Coherent light beams incident on respective positions of the first hologram recording medium 55-1 reproduce images 5 of the line-like or long-and-narrow scattering plate 6 in a manner that the images 5 are superimposed on the first illumination zone LZ-1 to illuminate the first illumination zone LZ-1. When a predetermined time passes, the irradiation unit 60 emits a coherent light beam to the second hologram recording medium 55-2 adjacent to the first hologram recording medium 55-1 to illuminate the second illumination zone LZ-2 adjacent to the first illumination zone LZ-1 with the coherent light beam in place of the first illumination zone LZ-1. Following to this, each hologram recording medium is irradiated with a coherent light beam so that the illumination zone corresponding to the hologram recording medium is illuminated with the coherent light beam. According to the method described above, it is possible to read a two-dimensional image information without moving the illumination device.

Spatial Light Modulator, Projection Optical System, and Screen

According to the embodiments described above, it is possible to effectively make speckles inconspicuous. However, the effects are mainly caused by the illumination device 40. Then, even if the illumination device 40 is combined with various known spatial light modulators, projection optical systems, screens, and the like, it is possible to effectively make speckles inconspicuous. Due to this point, the spatial light modulator, the projection optical system, and the screen are not limited to the exemplified ones, but various known members, parts, apparatuses, and the like may be used.

Projection-Type Image Display Apparatus

In addition, although the example is illustrated in which the hologram recording medium 55 is produced by an interference exposure method using the planar scattering plate 6 having a shape corresponding to the incidence planes of the spatial light modulator 30, the present invention is not limited thereto. The hologram recording medium 55 may be produced by an interference exposure method using a scattering plate having some pattern. In this case, an image of the scattering plate having some pattern is reproduced by the hologram recording medium 55. In other words, the optical device 50, i.e. hologram recording medium 55, illuminates the illumination region LZ having some pattern. In the case where this optical device 50 is used, by eliminating the spatial light modulator 30 and the projection optical system 25 from the basic embodiment described above and disposing the screen 15 at the position that overlaps with the illumination region LZ, it is possible to display some pattern recorded in the hologram recording medium 55 on the screen 15. Also in this display apparatus, by emitting a coherent light beam from the irradiation device 60 to the optical device 50 so that the coherent light beam scans the hologram recording medium 55, it is possible to make the speckles be inconspicuous on the screen 15.

FIG. 15 shows one example of such example. In the illustrated example, the optical device 50 includes first to third hologram recording media 55-1, 55-2 and 55-3. The first to third hologram recording media 55-1, 55-2 and 55-3 are arranged on a plane parallel to the incidence plane of the optical device 50 in a manner that they are displaced from one another so as not to be overlapped with one another. Each of the hologram recording media 55-1, 55-2 and 55-3 can reproduce an image 5 having the contour of an arrow. In other words, illumination zones LZ-1, LZ-2 and LZ-3 having the contour of an arrow can be illuminated with coherent light beams. The first to third illumination zones LZ-1, LZ-2 and LZ-3 corresponding to the hologram recording media 55-1, 55-2 and 55-3, respectively, are arranged on the same imaginary plane in a manner that they are not overlapped with one another. Above all, in the illustrated example, the directions indicated by the arrows corresponding to the illumination zones LZ-1, LZ-2 and LZ-3 are oriented in the same direction and the first to third illumination zones LZ-1, LZ-2 and LZ-3 are located in this order in this direction. For example, when a coherent light beam from the irradiation unit 60 is scanning the first hologram recording medium 55-1, the first illumination zone LZ-1 located most behind is illuminated. As an example, next, as shown in FIG. 15, a coherent light beam from the irradiation unit 60 scans the second hologram recording medium 55-2 so that the second illumination zone LZ-2 located in the center is illuminated. Thereafter, when a coherent light beam from the irradiation unit 60 scans the third hologram recording medium 55-1, the third illumination zone LZ-1 located most ahead is illuminated.

Irradiation Device

Figure 16:
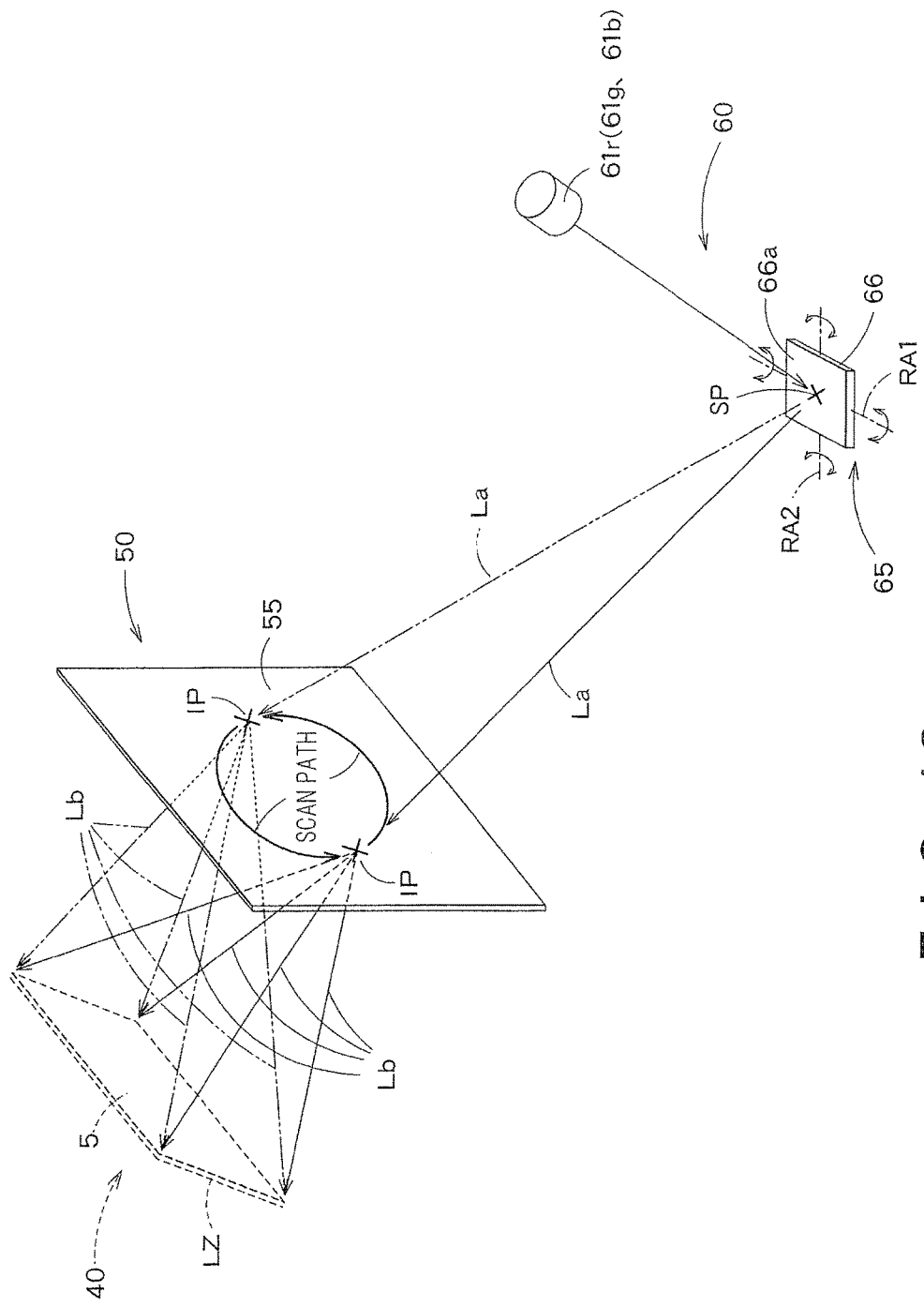
FIG. 16 is a view showing an example in which a mirror device 66 is rotated in two axial directions.

The embodiments described above shows an example in which the irradiation unit 60 includes the laser sources 61*r*, 61*g* and 61*b*, and the scanning device 65. The scanning device 65 includes, for example, the one-axis-rotation type mirror device 66 that changes the propagation direction of a coherent light beam by reflection. However, the scanning device 65 is not limited thereto. As shown in FIG. 16, the scanning device 65 may be configured so that the mirror, i.e. reflection plane 66*a*, of the mirror device 66 can rotate about the first rotation axis line RA1 as well as about a second rotation axis line RA2 intersecting the first rotation axis line RA1. In the example shown in FIG. 16, the second rotation axis line RA2 of the mirror 66*a* is perpendicular to the first rotation axis line RA1 which is extended in parallel to the Y axis of the XY coordinate system defined on the plate plane of the hologram recording medium 55. Then, since the mirror 66*a* can rotate about both of the first axis line RA1 and the second axis line RA2, the incidence point IP of a coherent light beam of the irradiation unit 60 incident on the optical device 50 can be shifted on the plate plane of the hologram recording medium 55 in two-dimensional directions. Therefore, as an example, as shown in FIG. 16, the incidence point IP of a coherent light beam incident on the optical device 50 can be shifted along a circumference.

Moreover, the scanning device 65 may include two or more mirror devices 66. In this case, although the mirror 66*a* of the mirror device 66 can rotate about only a single axis line, the incidence point IP of a coherent light beam from the irradiation device 60 incident on the optical device 50 can be shifted on the plate plane of the hologram recording medium 55 in two-dimensional directions.

As a concrete example of the mirror device 66*a* included in the scanning device 65, there are a MEMS mirror, a polygonal mirror, and the like.

Moreover, the scanning device 65 may be configured to include other devices other than a reflection device, for example, the mirror device 66 described above, which changes the propagation direction of a coherent light beam by reflection. For example, the scan device 65 may include a refraction prism, a lens, etc.

Essentially, the scanning device 65 is not a necessary component. The light sources 61*r*, 61*g* and 61*b* of the irradiation device 60 may be configured so that they can be displaced, i.e. moved, oscillated, and rotated, with respect to the optical device 50. Coherent light beams emitted therefrom may scan the hologram recording medium 55 in accordance with the displacement of the light sources 61*r*, 61*g* and 61*b* with respect to the optical device.

Moreover, although the description hereinbefore is made on condition that the light sources 61*r*, 61*g* and 61*b* of the irradiation device 60 oscillate a laser beam shaped into a line beam, the preset invention is not limited thereto. Particularly, in the embodiments described above, coherent light beams emitted to respective positions of the optical device 50 are shaped by the optical device 50 into a light flux which is incident on the entire region of the illumination region LZ. Therefore, no problem occurs even if coherent light beams emitted from the light sources 61r, 61g and 61b of the irradiation device 60 to the optical device 50 are not accurately shaped. For this reason, coherent light beams generated from the light sources 61r, 61g and 61b may be diverging light. In addition, the shape of coherent light beams, in cross section, generated from the light sources 61r, 61g and 61b may be an ellipse or the like instead of a circle. In addition, the transverse mode of coherent light beams generated from the light sources 61r, 61g and 61b may be a multi-mode.

In addition, when the light sources 61r, 61g and 61b generate a diverging light flux, coherent light beams are incident on the hologram recording medium 55 of the optical device 50 not on a spot but on a region having a certain area. In this case, light beams which are diffracted by the hologram recording medium 55 and incident on respective positions of the illumination region LZ are angle-multiplexed. In other words, in each instant, on respective positions of the illumination region LZ, coherent light beams are incident from directions within a certain angle range. Due to the angle-multiplexing, it is possible to more effectively make speckles inconspicuous.

Figure 17:
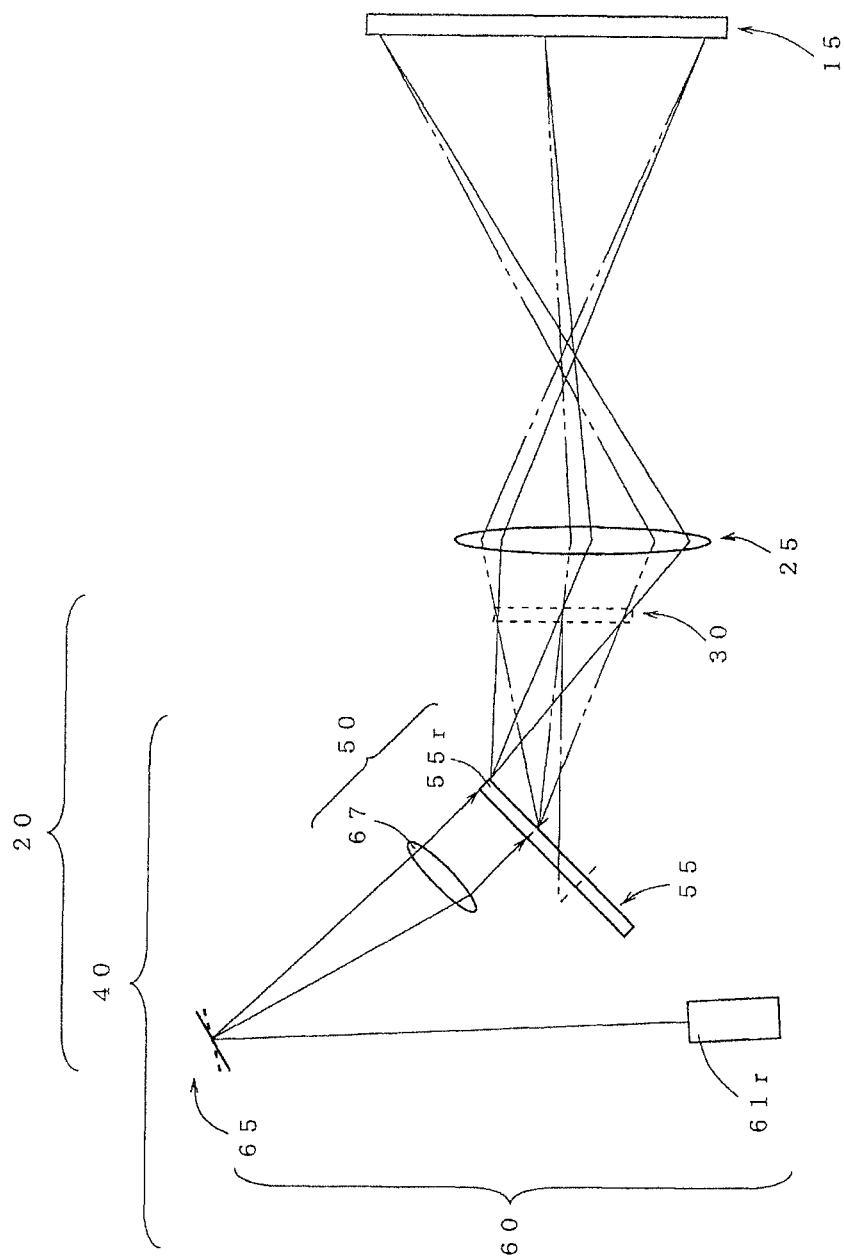
FIG. 17 is a view showing an example in which a parallel beam is incident on the hologram recording medium 55.

Moreover, in the embodiments described above, although the example is described in which the irradiation unit 60 emits a coherent light beam to the optical device 50 so that the coherent light beam traces the optical path of one beam included in a light flux, the present invention is not limited thereto. For example, in the above embodiments, as shown in FIG. 17, the scanning device 65 may further include a condenser lens 67 disposed at the downstream side of the mirror device 66 along the optical path of a coherent light beam. In this case, a light beam from the mirror device 66, which propagates along the optical path of light beams constituting a light flux, becomes a light beam that propagates in a certain direction through the condenser lens 67. In other words, the irradiation device 60 emits a coherent light beam to the optical device 50 so that the coherent light beam traces the optical path of one beam included in a light flux. In this kind of example, instead of a converging light flux described above, a parallel light flux is used as the reference light beam Lr in the exposure process in the production of the hologram recording medium 55. The hologram recording medium 55 described above can be more simply produced and replicated.

Optical Device

In the embodiment described above, although the example in which the optical device 50 is configured with a reflection-type volume hologram recording medium 55 using photopolymer has been described, the present invention is not limited thereto. As already explained, the optical device 50 may include a plurality of hologram recording media 55. Moreover, the optical device 50 may include a volume hologram recording medium that is a type in which recording is performed by using a photosensitive medium including a silver halide material. Moreover, the optical device 50 may include a transmission-type volume hologram recording medium or a relief-type, i.e. emboss-type, hologram recording medium.

With respect to the relief-type, i.e. emboss-type, hologram recording medium, a hologram interference fringe is recorded using a convex-concave structure of the surface thereof. However, in the case of the relief-type hologram recording medium, scattering due to the convex-concave structure of the surface may also cause generation of new speckles, hence in this respect, the volume hologram recording medium is preferable. In the case of the volume hologram recording medium, a hologram interference fringe is recorded as a refractive index modulation pattern, i.e. refractive index distribution, of an inner portion of the medium, hence there is no influence of scattering because of the convex-concave structure of the surface.

However, even when the volume hologram recording medium is used, a type in which recording is performed using a photosensitive medium including a silver halide material may become a cause of generating new speckles due to scattering of silver halide particles. In this respect, the volume hologram recording medium using a photopolymer is preferable as the hologram recording medium 55.

Moreover, in the exposure process shown in FIG. 3, although a so-called Fresnel-type hologram recording medium is produced, a Fourier transform-type hologram recording medium which can be obtained through recording using lenses may be produced. When the Fourier transform-type hologram recording medium is used, lenses can also be used for image reproduction.

In addition, a striped pattern, i.e. refractive index modulation pattern or convex-concave pattern, which is to be formed on the hologram recording medium 55 may be designed by using a computer based on a planned wavelength or incidence direction of a reproduction illumination light beam La, a shape or position of an image to be reproduced, and the like, without use of an actual object light beam Lo and reference light beam Lr. The hologram recording medium 55 obtained in this manner is called a computer generated hologram recording medium. Moreover, when a plurality of coherent light beams having mutually different wavelength ranges are emitted from the irradiation device 60 in a similar manner in the modification described above, the hologram recording medium 55 as a computer generated hologram recording medium may be partitioned two-dimensionally into a plurality of regions provided corresponding to coherent light beams of respective wavelength ranges so that the coherent light beams of the respective wavelength ranges are diffracted in the corresponding regions to reproduce images.

Moreover, in the embodiments described above, although the example is described in which the optical device 50 includes the hologram recording medium 55 by which coherent light beams emitted to respective positions thereof are spread to illuminate the entire region of the illumination region LZ, the present invention is not limited thereto. Instead of the hologram recording medium 55 or in addition to the hologram recording medium 55, the optical device 50 may include a lens array as an optical device by which the propagation directions of coherent light beams incident on respective positions thereof are changed and the coherent light beams are diffused to illuminate the entire region of the illumination region LZ. As a concrete example of the lens array, a total reflection-type or refraction-type Fresnel screen having a diffusing function, a fly-eye lens, and the like may be exemplified. In this type of illumination device 40, the irradiation device 60 and the optical device 50 may be configured so that the irradiation device 60 emits coherent light beams to the optical device 50 so that the coherent light beams scan the lens array and the coherent light beams incident on respective positions of the optical device 50 from the irradiation device 60 undergo change in the propagation directions by the lens array to illuminate the illumination region LZ, thus effectively making speckles inconspicuous.

In more concretely, in the case of the present embodiment, it is required to provide a lens array that includes at least three lenses corresponding to the laser sources 61*r*, 61*g* and 61*b*, respectively. On each lens, a coherent light beam is incident that is emitted from the corresponding laser source and then reflected by the scanning device 65. Then, through each lens, an incident light beam is diffused to illuminate the entire region of the illumination zone LZ. With this configuration, even if the hologram recording medium 55 is not provided, the entire region of the illumination zone LZ can be illuminated with white light, for example.

Illuminating Method

In the embodiments described above, an example is shown in which the irradiation device 60 is configured to be able to scan the optical device 50 in a one-dimensional direction with coherent light beams and the hologram recording medium 55 or the lens array of the optical device 50 is configured to diffuse, i.e. spread and diverge the coherent light beams incident on respective positions of the hologram recording medium 55 in a two-dimensional direction, so that the illumination device 40 illuminates the two-dimensional illumination region LZ. However, as described above, the present invention is not limited to such example. For example, the irradiation device 60 may be configured to be able to scan the optical device 50 in a two dimensional direction with coherent light beams and the hologram recording medium 55 or the lens array of the optical device 50 may be configured to diffuse, i.e. spread and diverge, the coherent light beams incident on respective positions of the hologram recording medium 55 in a two-dimensional direction, so that the illumination device 40 illuminates the two-dimensional illumination region LZ, as shown in FIG. 16.

Moreover, as already described, the irradiation device 60 may be configured to be able to scan the optical device 50 in a one-dimensional direction with coherent light beams and the hologram recording medium 55 or the lens array of the optical device 50 may be configured to diffuse, i.e. spread and diverge, the coherent light beams incident on respective positions of the hologram recording medium 55 in a one-dimensional direction, so that the illumination device 40 illuminates the one-dimensional illumination region LZ. In this configuration, the scanning direction of a coherent light beam from the irradiation unit 60 and the diffusing direction, i.e. spreading direction, by the hologram recording medium 55 or the lens array of the optical device may be parallel with each other.

Furthermore, the irradiation device 60 may be configured to be able to scan the optical device 50 in a one- or two-dimensional direction with coherent light beams and the hologram recording medium 55 or the lens array of the optical device 50 may be configured to diffuse, i.e. spread and diverge, the coherent light beams incident on respective positions of the hologram recording medium 55 in a one-dimensional direction. In this configuration, as already described, the optical device 50 may have a plurality of hologram recording media 55 or lens arrays to illuminate illumination zones LZ corresponding to the hologram recording media 55 or lens arrays successively, so that illumination device 40 illuminates a two-dimensional region. In this occasion, the illumination zones LZ may be successively illuminated at a speed felt like as if simultaneously illuminated for human eyes or at a low speed so that human eyes can recognize that the illumination zones LZ are successively illuminated.

The present invention is not limited to the embodiments described above but includes various modifications conceivable by those skilled in the art. The effects of the present invention are also not limited to those described above. Namely, various additions, modifications and partial omissions may be made without departing from the conceptual idea and gist of present invention derived from those defined in the accompanying claims and their equivalents.

The invention claimed is:

1. An illumination device comprising:
an optical device including a hologram recording medium capable of reproducing an image of a reference member on an illumination zone, the optical device varying an incidence angle of a coherent light beam at each position on the illumination zone with time, wherein the optical device is fixed, so as to prevent rotation and movement thereof; and
an irradiation unit to irradiate a coherent light beam to the optical device so that the coherent light beam scans the hologram recording medium,
wherein the irradiation unit comprises:
a light source for emitting a coherent light beam; and
a scanning device capable of adjusting a reflection angle of the coherent light beam emitted from the light source and to make a reflected coherent light beam scan on the hologram recording medium,
wherein the light source comprises a plurality of light sources for emitting a plurality of coherent light beams having different wavelength ranges,
the hologram recording medium comprises a plurality of recording areas to be scanned with a plurality of coherent light beams reflected by the scanning device, respectively,
each of the plurality of recording areas comprises an interference fringe that diffracts a coherent light beam of the corresponding wavelength range, and
the reflection angle of the scanning device is controlled so that a coherent light beam having a wavelength range corresponding to each of the plurality of recording areas is incident on the corresponding recording area while changing an incident direction of the coherent light beam with time and a coherent light beam having a wavelength range different from the corresponding wavelength range is not incident on the corresponding recording area,
wherein the optical device uses the plurality of coherent light beams reflected by interference fringes of the plurality of recording areas to reproduce the image of the reference member so that each of the coherent light beams is diffracted by each of the plurality of recording areas in the hologram recording medium and the diffracted coherent light beams are superimposed on the entire region of the illumination zone.

2. The illumination device of claim 1, wherein the plurality of recording areas are provided in the plane direction of the hologram recording medium so as not to be overlapped with one another.

3. The illumination device of claim 1, wherein the plurality of recording areas are stacked in a thickness direction of the hologram recording medium.

4. The illumination device of claim 1, wherein the plurality of coherent light beams emitted from the plurality of light sources are emitted to an identical point on the scanning device.

5. The illumination device of claim 4, wherein a plurality of coherent light beams reflected at the identical point on the scanning device are incident on the hologram recording medium as diffused light beams.

6. The illumination device of claim 4, wherein the plurality of light sources emit a plurality of coherent light beams comprising different wavelength ranges in roughly parallel directions,
wherein the irradiation unit further comprises a convergence lens to emit the plurality of coherent light beams emitted from the plurality of light sources in the roughly parallel directions to the identical point of the scanning device.

7. The illumination device of claim 1, wherein the plurality of coherent light beams emitted from the plurality of light sources and incident on the scanning device are parallel beams.

8. The illumination device of claim 1, wherein the plurality of coherent light beams incident on the hologram recording medium after reflected by the scanning device are parallel beams.

9. The illumination device of claim 8 further comprising parallel-beam generating means to convert the coherent light beams reflected and diffused at an identical point on the scanning device into parallel beams to be incident on the hologram recording medium.

10. The illumination device of claim 1, wherein the plurality of light sources emit coherent light beams simultaneously so that the image of the reference member becomes white when the plurality of coherent light beams incident on the plurality of recording areas from the irradiation unit reproduce the image of the reference member to be superimposed.

11. The illumination device of claim 1, wherein the plurality of light sources emit coherent light beams successively in a time-divisional manner so that a color of the image of the reference member changes periodically when the plurality of coherent light beams incident on the plurality of recording areas from the irradiation unit reproduce the image of the reference member to be superimposed.

* * * * *